(12) United States Patent
Nork et al.

(10) Patent No.: US 6,411,531 B1
(45) Date of Patent: Jun. 25, 2002

(54) CHARGE PUMP DC/DC CONVERTERS WITH REDUCED INPUT NOISE

(75) Inventors: Samuel H. Nork, Andover; William L. Walter; Steven L. Martin, both of Lowell, all of MA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 09/721,600

(22) Filed: Nov. 21, 2000

(51) Int. Cl.[7] .............................................. H02M 3/18
(52) U.S. Cl. ...................................................... 363/60
(58) Field of Search ................................ 323/222, 282; 307/110; 363/59, 60

(56) References Cited

U.S. PATENT DOCUMENTS

| | | |
|---|---|---|
| 4,809,152 A | 2/1989 | Bingham et al. |
| 4,812,961 A | 3/1989 | Essaff et al. |
| 4,897,774 A | 1/1990 | Bingham et al. |
| 6,157,180 A | * 12/2000 | Kuo ........................... 323/282 |
| 6,188,212 B1 | * 2/2001 | Larson et al. ................ 323/281 |
| 6,201,717 B1 | * 3/2001 | Grant ........................... 363/60 |

OTHER PUBLICATIONS

"Switched–Capacitor Voltage Converter with Regulation," LT1054 DataSheet, 1994, pp. 4–26–4–37.

* cited by examiner

Primary Examiner—Adolf Deneke Berhane
(74) Attorney, Agent, or Firm—Fish & Neave; Robert W. Morris

(57) ABSTRACT

A charge pump DC/DC converter with reduced noise at the input voltage source is provided. The present invention includes buck and boost DC/DC converters with added circuitry coupled between the input voltage and the switches which maintains a substantially constant input current on both phases of the charge pump clock. The added circuitry reduces input current variations to provide reduced noise at the input voltage source. Feedback loop circuitry coupled between the output node and the added circuitry varies the current through the switches to control the output current of the DC/DC converter in order to maintain the output voltage at the regulated value. The added circuitry may comprise a variable resistor, current mirror, or current mirrors.

44 Claims, 9 Drawing Sheets

CHARGE PUMP DC/DC CONVERTERS WITH REDUCED INPUT NOISE

BACKGROUND OF THE INVENTION

This invention relates to charge pump DC/DC converters. More specifically, this invention relates to charge pump DC/DC converters with reduced noise at the input voltage source.

A charge pump DC/DC converter is a power supply circuit that provides a regulated output voltage to a load from an input voltage source. One type of charge pump DC/DC converter is a switching DC/DC converter power supply that uses switches to convert the input voltage to a regulated output voltage. The switches are operated in sequence to first charge a capacitor from the input voltage and then transfer the charge to the output.

However, one of the most common drawbacks of switching power supplies is the noise induced on the input voltage source due to fluctuations or variations in the current drawn by the converter power supply. When current flows from the input voltage to the capacitor, the input voltage is loaded causing it to decrease slightly. When the capacitor is decoupled from the input voltage, the input voltage rises. These voltage changes appear as noise on the input voltage bus. The magnitude of these changes in the input voltage level depends upon the equivalent series resistance of the input voltage source and the magnitude of the changes in the input current.

Certain applications such as cellular telephones, precision instrumentation, etc. are sensitive to noise generated on the input voltage. Therefore, noise on the input voltage caused by a power supply must be filtered to prevent degraded electrical performance in other circuitry that is powered from the same input voltage source.

It would therefore be desirable to provide a charge pump DC/DC converter that has reduced noise on the input voltage source.

It would therefore be desirable to provide a charge pump DC/DC converter with a substantially constant input current.

SUMMARY OF THE INVENTION

It is an object of the present invention to provide a charge pump DC/DC converter that has reduced noise on the input voltage source.

It is an object of the present invention to provide a charge pump DC/DC converter with a substantially constant input current.

These and other objects of the present invention are provided by charge pump DC/DC converters including circuitry to reduce variations in the input current, and methods for using the same. The circuitry may include an adjustable resistor, current mirror, or current mirrors coupled to the input voltage, and feedback loop circuitry. The feedback loop circuitry is coupled to the output voltage, and responds to changes in the output voltage to control the output current of the charge pump to maintain the output voltage at the regulated value. Additional circuitry may be added to charge pumps of the present invention to provide a substantially constant input current during the blanking intervals when all of the switches are open. Charge pump DC/DC converters of the present invention include buck and boost converters.

BRIEF DESCRIPTION OF THE DRAWINGS

The above-mentioned objects and features of the present invention can be more clearly understood from the following detailed description considered in conjunction with the following drawings, in which the same reference numerals denote the same structural elements throughout, and in which.

DETAILED DESCRIPTION OF THE PREFERRED EMBODIMENTS

Figure 1A:
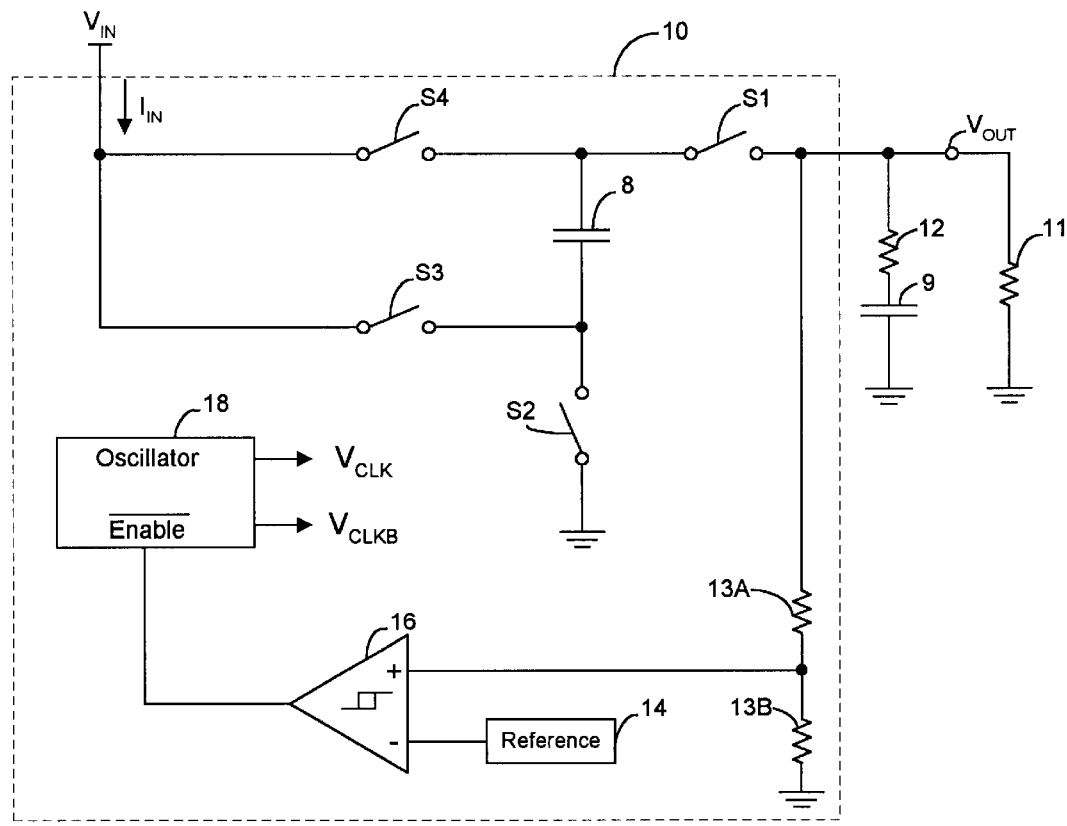
FIG. 1A is a schematic diagram of a prior art charge pump DC/DC converter.

One previously known charge pump DC/DC converter 10 is shown in FIG. 1A. Charge pump 10 has capacitor 8 and switches S1, S2, S3, and S4. Charge pump 10 supplies a regulated voltage $V_{OUT}$ at an output node from input voltage $V_{IN}$. The equivalent series resistance of output capacitor 9 is represented by resistor 12, and resistor 11 represents a load. Switches S1/S3 are switched out of phase with switches S2/S4 by clock signals $V_{CLK}$ and $V_{CLKB}$, respectively.

Circuit 10 also has resistors 13A and 13B, reference voltage source 14, and hysteretic comparator 16. When comparator 16 senses that $V_{OUT}$ has risen to a voltage threshold set by reference 14, the output of comparator 16 goes HIGH causing oscillator 18 to stop so that switches S1–S4 remain open and no charge is transferred to $V_{OUT}$ from $V_{IN}$. When $V_{OUT}$ falls below the threshold of comparator 16, its output goes LOW, and oscillator 18 resumes the switching of switches S1–S4.

Figure 1B:
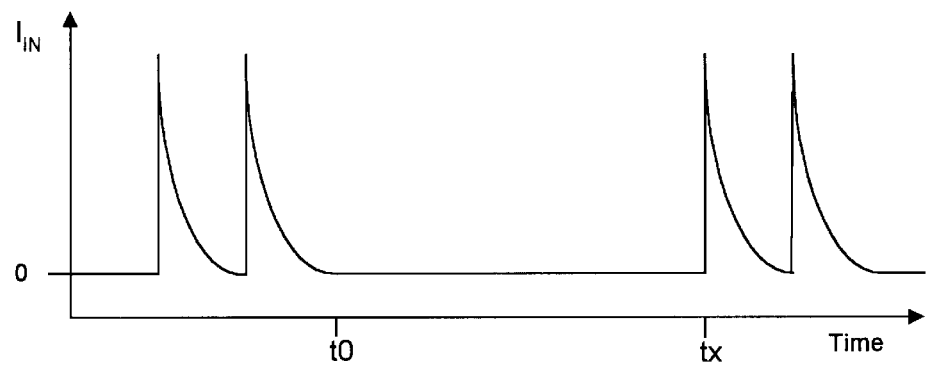
FIG. 1B is a graph of the input current for the charge pump DC/DC converter shown in FIG. 1A.

The input current into circuit 10 is represented by $I_{IN}$ and is shown in graphical form in FIG. 1B. $I_{IN}$ varies substantially as switches S1–S4 are opened and closed, and is zero between times t0 and tx when the output of comparator 16 is HIGH. The large variations in $I_{IN}$ caused by circuit 10 as shown in FIG. 1B produce variations in $V_{IN}$ that correspond to undesirable low frequency noise. Low frequency noise tends to be very difficult and impractical to filter because very large and expensive filter components are needed to remove low frequency noise.

Figure 2A:
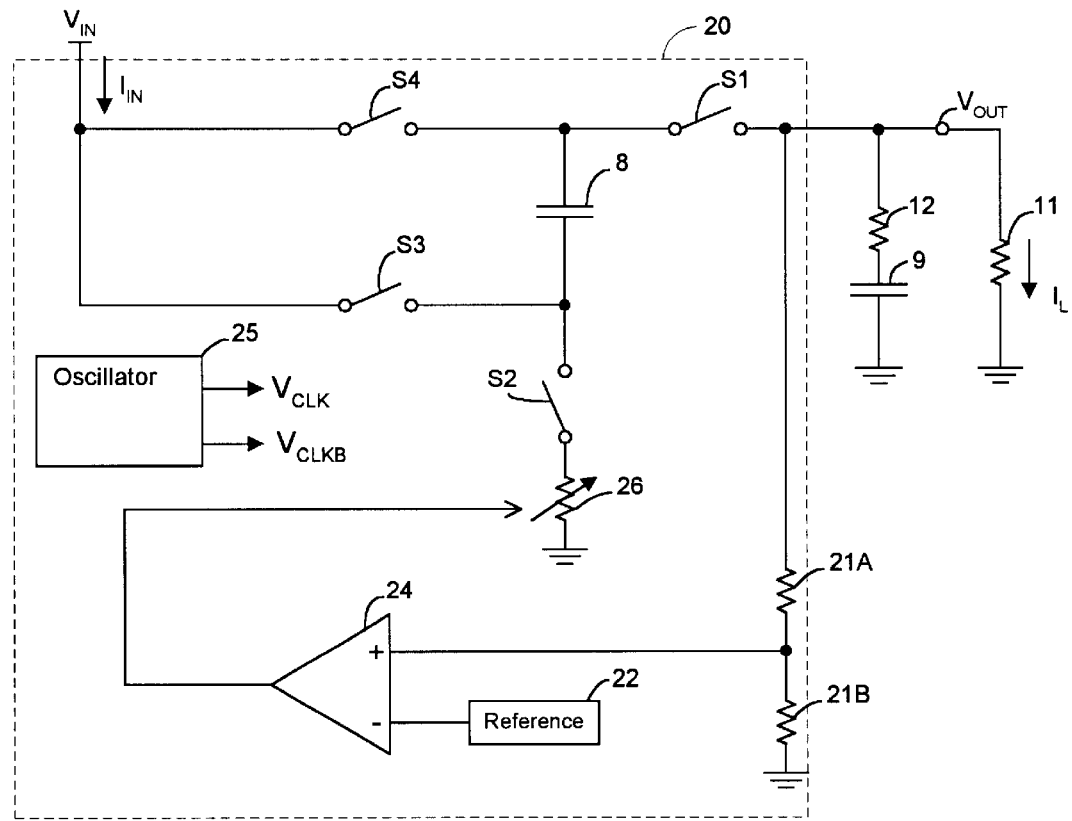
FIG. 2A is a schematic diagram of another prior art charge pump DC/DC converter.

Previously known charge pump DC/DC converter is shown in FIG. 2A. Circuit 20 has capacitor 8, adjustable resistor 26, oscillator 25, and switches S1, S2, S3, and S4. Oscillator 25 provides clock signals $V_{CLK}$ and $V_{CLKB}$ that control the opening and closing of switches S1–S4 as discussed above with respect to FIG. 1A. Circuit 20 also has resistor divider 21A/21B, amplifier 24, and reference voltage source 22. Amplifier 24 varies the resistance of adjustable resistor 26 in response to the voltage at its non-inverting input to maintain $V_{OUT}$ at the regulated voltage. Adjustable resistor 26 may be a field effect transistor (such as an N-channel MOSFET) that is operated in its linear region.

Figure 2B:
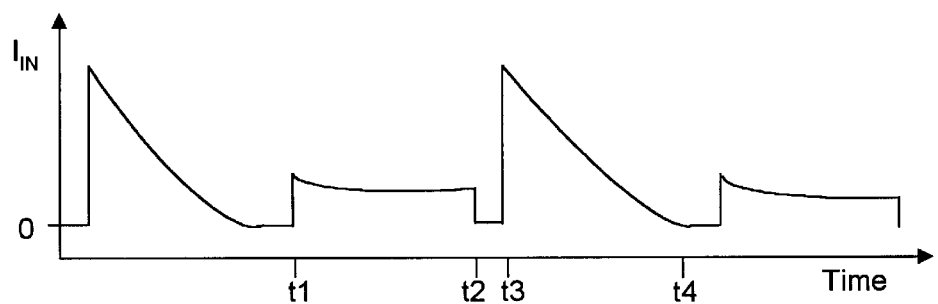
FIG. 2B is a graph of the input current for the charge pump DC/DC converter of FIG. 2A.

Input current $I_{IN}$ is shown in FIG. 2B for circuit 20. At time t1, switches S2/S4 are closed and $I_{IN}$ flows through adjustable resistor 26. Resistor 26 limits the current and reduces the spike input current $I_{IN}$. The charge stored in capacitor 8 is limited by resistor 26 when switches S2/S4 are conducting. However, at time t3 when switches S2/S4 are open and S1/S3 are closed, the current spike is still undesirably large. Circuit 20 has less noise on the input voltage source because of the reduced input current when S2/S4 conduct. Nevertheless, the variations in $I_{IN}$ caused by circuit 20 still produce undesirably large input voltage noise characteristics in the low frequency range (i.e., at the switching frequency). Undesirable higher frequency noise is caused by variations in the input current during each blanking interval (e.g., between times t2 and t3) when all of the switches are open. Another previous known charge pump converter is the LT1054 discussed in LTC's (Linear Technology Corporation's) 1994 databook.

Charge pump DC/DC converters of the present invention may include control circuitry coupled to the input voltage that reduces variations in the input current. The control circuitry controls the input current during each phase of a switching cycle in order to reduce voltage fluctuations on the input voltage source that cause low frequency noise. A control circuit including an amplifier and a resistor divider coupled to the output voltage adjusts the current through the control circuitry so that the output current of the converter matches the load current and the output voltage remains at the regulated value. The control circuitry may include an adjustable resistor, a current mirror, or current mirrors.

Figure 3A:
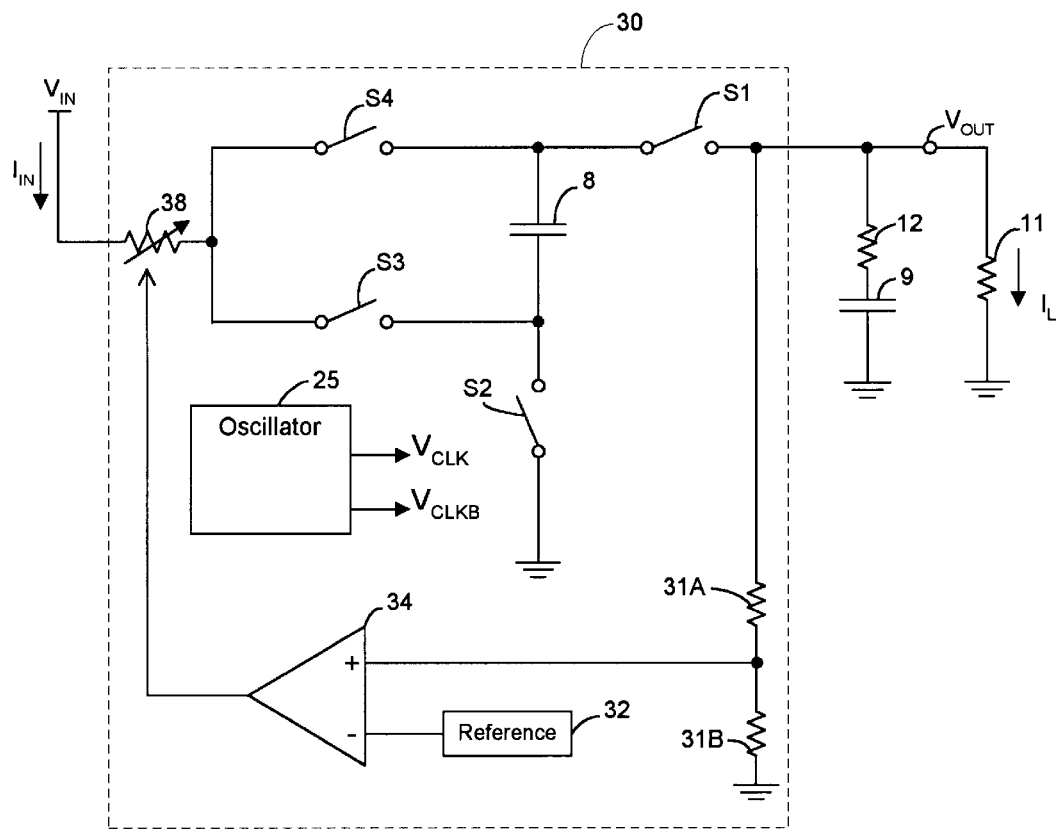
FIG. 3A is a schematic of a boost charge pump DC/DC converter of the present invention.
Figure 3B:
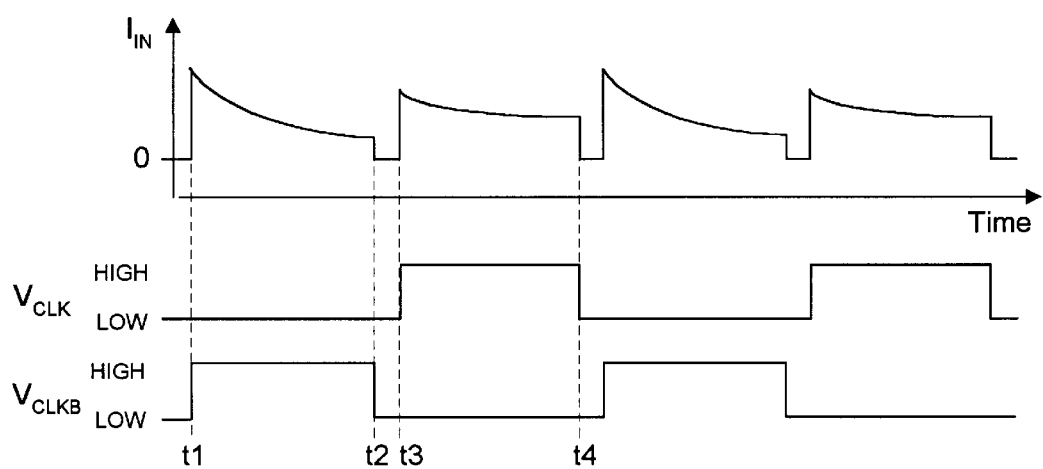
FIG. 3B is a graph of the input current and clock signals for the boost charge pump DC/DC converter of FIG. 3A.

Charge pump DC/DC converter 30 of the present invention is shown in FIG. 3A. Converter 30 has capacitor 8, oscillator 25, adjustable resistor 38, and switches S1, S2, S3, and S4. Switches S1–S4 (and all other switches discussed with respect to the present invention) may comprise FETs (such as MOSFETs) or BJTs (bipolar junction transistors). The circuit components are coupled in a boost arrangement so that converter 30 regulates an output voltage $V_{OUT}$ that is higher than $V_{IN}$. Circuit 30 provides an output current to load 11 and maintains $V_{OUT}$ at the regulated voltage. Output capacitor 9 is coupled to $V_{OUT}$. Oscillator outputs clock signals $V_{CLK}$ and $V_{CLKB}$ which are digital periodic pulse waveforms that control the opening and closing of switches S1, S2, S3, and S4. Clock signals $V_{CLK}$ and $V_{CLKB}$ are shown in FIG. 3B. $V_{CLK}$ and $V_{CLKB}$ are out of phase with each other, and include brief blanking intervals when both clock signals are LOW and all four switches are open (e.g., between times t2 and t3) to prevent shorting $V_{IN}$ or capacitor 8 to ground or $V_{OUT}$.

Switches S2/S4 are closed (i.e., conducting current) when $V_{CLKB}$ is HIGH, for example, between times t1 and t2. Switches S2/S4 are open (i.e., not conducting current) when $V_{CLKB}$ is LOW. Switches S1/S3 are closed (i.e., conducting current) when $V_{CLK}$ is HIGH, for example, between times t3 and t4. Switches S1/S3 are open (i.e., not conducting current) when $V_{CLKB}$ is LOW. When switches S2/S4 are closed and switches S1/S3 are open, input current $I_{IN}$ flows from input voltage $V_{IN}$ through adjustable resistor 38 and switch S4 to capacitor 8. An illustrative graph of the input current $I_{IN}$ for circuit 30 is shown in FIG. 3B, wherein switches S2/S4 are closed between times t1 and t2. When switches S2/S4 close at time t1, $I_{IN}$ increases rapidly (i.e., spikes). Between times t1 and t2, current $I_{IN}$ ramps down according to the time constant determined by capacitor 8 and the series resistance of switches S2/S4 and resistor 38. By limiting current $I_{IN}$, adjustable resistor 38 reduces the input current spikes at time t1, so that variations in input current $I_{IN}$ are reduced during the first half of each switching cycle between t1 and t2, thereby reducing undesirable low frequency noise on the input voltage.

When switches S1/S3 are closed and switches S2/S4 are open, input current $I_{IN}$ flows from input voltage $V_{IN}$ through adjustable resistor 38 and switch S3 to capacitor 8, and current flows from capacitor 8 through switch S1 to the load. Switches S1 and S3 are closed between times t3 and t4 in FIG. 3B. When switches S1/S3 close at time t3, $I_{IN}$ spikes. Between times t3 and t4, current $I_{IN}$ ramps down according to the time constant determined by capacitor 8 and the series resistance of switches S1/S3 and resistor 38. Adjustable resistor 38 reduces the input current spike at time t3 relative to circuit 20, so that variations in input current $I_{IN}$ are reduced between times t3 and t4 during the second half of each switching cycle, thereby reducing undesirable low frequency noise at the input voltage. Thus, adjustable resistor 38 controls the input current through capacitor 8 and all four switches during each phase of the clock cycle.

The current through a capacitor is determined by the following standard equation:

$$I = C\frac{dV}{dt} \quad (1)$$

The current through a capacitor is determined by the following standard equation:

$$I = C\frac{dV}{dt} \quad (1)$$

The charge that is added to capacitor 8 from $V_{IN}$ when switches S2 and S4 are closed equals the charge that is transferred to the load when switches S1 and S3 are closed, during a steady state condition (i.e., constant load current). The change in voltage across capacitor 8 ($dV_{tx}$) when S2 and S4 are closed equals the change in voltage across capacitor 8 ($dV_{ty}$) when S1 and S3 are closed during a steady state. Setting these quantities equal to each other from equation (1) it can be seen that:

$$dV_{tX} = dV_{tY} = \frac{I_{R38}}{C_8}t_x = \frac{I_{R38}}{C_8}t_y \quad (2)$$

where $C_8$ is the capacitance of capacitor 8, $t_x$ is the time period that switches S2 and S4 are closed in each switching cycle, and $t_y$ is the time period that switches S1 and S3 are closed in each switching cycle. $I_{R38}$ is the average current through resistor 38, which is about the same during both time periods. Solving equation (2), it can be seen that $t_x=t_y$. Therefore, the optimum duty cycle for switches S1–S4 is 50% (ignoring the relatively brief blanking interval). Times $t_x$ and $t_y$ are determined by clock signals $V_{CLKB}$ and $V_{CLK}$, respectively.

The average output current $I_{OUT}$ of converter (i.e., the average current through switch S1) equals the load current $I_L$ during steady state operation. Current flowing through resistor 38 is only sent to $V_{OUT}$ for one half of each switching cycle when S1 is closed. During the other half of the switching cycle, the output current of converter 30 equals zero, because S1 is open. Therefore, the average current $I_{R38}$ through adjustable resistor 38 must be twice the average output current $I_{OUT}$.

The average current through resistor 38 when switches S2 and S4 are closed is shown in the following equation:

$$I_{R38} = \frac{V_{IN} - V_{C8}}{R_{38}} \quad (3)$$

where $R_{38}$ is the resistance of adjustable resistor 38, and $V_{C8}$ is the average voltage across capacitor 8. The average current through resistor 38 when switches S1 and S3 are closed is shown in the following equation:

$$I_{R38} = \frac{V_{IN} + V_{C8} - V_{OUT}}{R_{38}} \quad (4)$$

The current through resistor 38 equals the current through capacitor 8, because the two elements are coupled in series during both switching states. Therefore, the average current through resistor 38 when switches S2 and S4 are closed as shown by equation (3) equals the average current through resistor 38 when S1 and S3 are closed as shown by equation (4), during a steady state. Solving equations (3) and (4), it can be shown that $V_{C8}$ equals one half of $V_{OUT}$.

Substituting $I_{R38}=2I_{OUT}=2I_L$ and $V_{C8}=V_{OUT}/2$ into equation (3), one can derive the following equation:

$$R_{38} = \frac{V_{IN} - \frac{V_{OUT}}{2}}{2I_L} \quad (5)$$

The resistance value $R_{38}$ of resistor 38 can be adjusted (by amplifier 34 as discussed below) according to equation (5) to supply the load current $I_L$, for selected values of $V_{IN}$ and $V_{OUT}$.

For the following discussion, equation (5) can be rearranged so that $V_{OUT}=2V_{IN}-4I_L R_{38}$. Assuming for purposes of illustration that $R_{38}$ equals zero, $V_{IN}$ is applied across capacitor 8 when switches S2/S4 are closed. The voltage across a capacitor does not change instantaneously. Thus, when switches S1/S3 close, the voltage across capacitor 8 ($V_{IN}$) plus $V_{IN}$ is applied to $V_{OUT}$. Therefore, $V_{OUT}$ equals $2V_{IN}$ in the illustrative case where $R_{38}$ equals zero for boost converter 30. This is the maximum value for $V_{OUT}$. When $R_{38}$ has a positive non-zero value, $V_{OUT}$ becomes less than twice $V_{IN}$ according to the load current as shown by equation (5).

Charge pump 30 also includes a feedback loop that comprises a resistor divider including resistors 31A and 31B, reference voltage source 32, and amplifier 34. The feedback loop is used to control the resistance of variable resistor 38 and thereby control current delivered to output capacitor 9 and load 11 to regulate output voltage $V_{OUT}$. The resistance of resistor 38 is set by the feedback loop circuitry to be a function of the output current. Resistor divider 31A/31B provides a voltage feedback signal proportional to $V_{OUT}$ at the non-inverting input of amplifier 34. Reference voltage source 32 provides a constant reference voltage signal at the inverting input of amplifier 34. Amplifier 34 amplifies the difference between the feedback signal and the reference voltage, and provides an amplified signal at its output to control the resistance of adjustable resistor 38. Adjustable resistor 38 may be a field effect transistor (such as an N-channel MOSFET) that is operated in its linear region.

When load current $I_L$ is less than the average output current delivered to load 11 by circuit 30, the excess charge is stored on output capacitor 9 and $V_{OUT}$ increases by a small amount. The voltage feedback signal increases proportionally with $V_{OUT}$, causing the voltage output signal of amplifier 34 to increase. This increases the resistance of adjustable resistor 38 causing the average output current of circuit 30 to decrease so that $V_{OUT}$ is maintained at the regulated voltage.

When load current $I_L$ is greater than the average output current delivered to load 11 by circuit 30, charge is removed from output capacitor 9 by load current $I_L$ and $V_{OUT}$ decreases by a small amount. The voltage feedback signal also decreases proportionally with $V_{OUT}$, causing the voltage output signal of amplifier 34 to decrease. The resistance of adjustable resistor 38 now decreases, causing the average output current of circuit 30 to increase so that $V_{OUT}$ is maintained at the regulated voltage.

Instead of variable resistor 38, DC/DC charge pump converters of the present invention may include one or more current mirrors coupled to the input voltage that conduct a substantially constant input current in a steady state condition during each phase of the switching cycle. The current mirrors control the input current during each phase of the clock cycle (except during the blanking intervals) to reduce voltage fluctuations on the input voltage source that cause noise. A feedback loop including a transconductance amplifier and a resistor divider coupled to the output voltage adjusts the current through the current mirrors so that the output current of the converter matches the load current and the output voltage stays regulated.

Figure 4A:
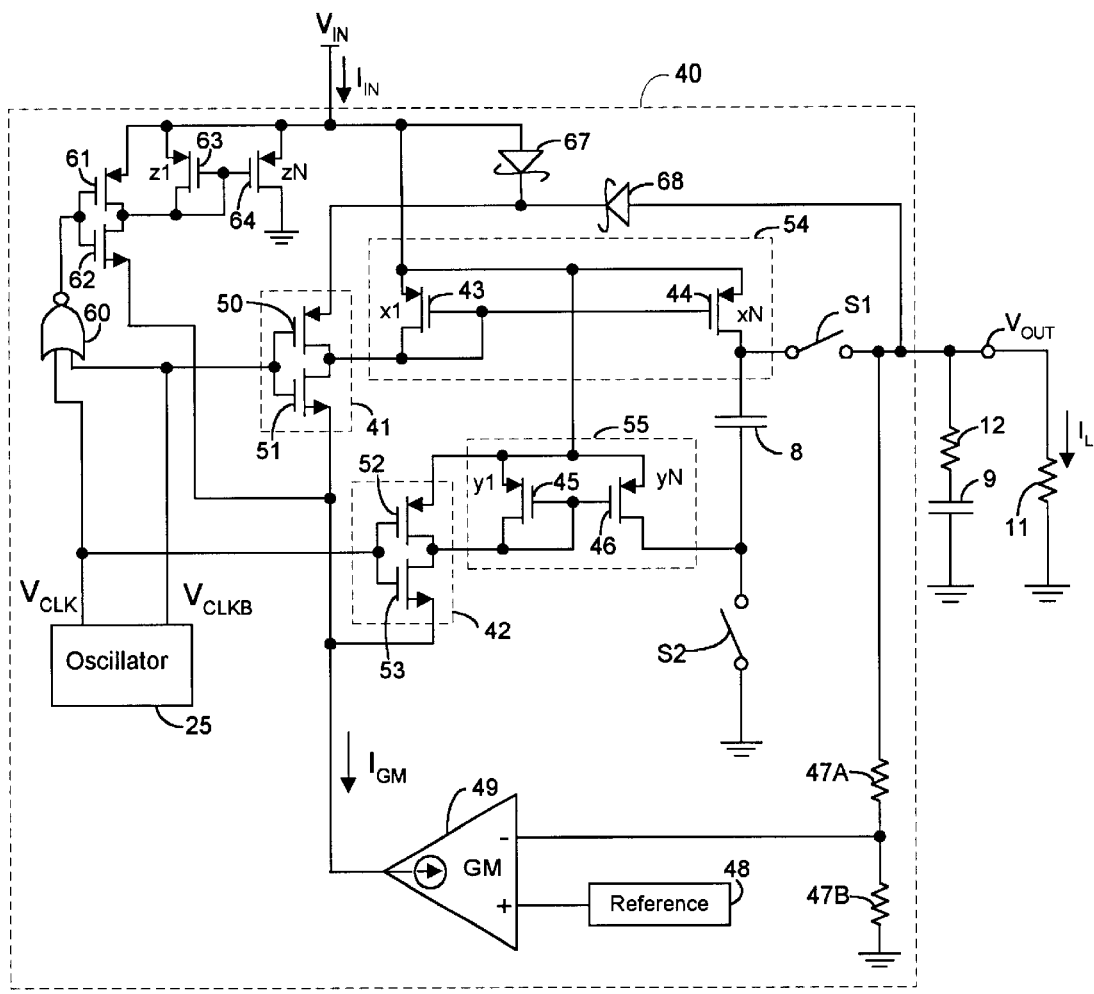
FIG. 4A is a schematic of another boost charge pump DC/DC converter of the present invention.

An embodiment of the present invention using current mirrors is shown in FIG. 4A, wherein charge pump DC/DC converter 40 includes switches S1 and S2, flying capacitor 8, inverters 41 and 42, oscillator 25, and a current mirrors 54 and 55. Converter 40 also has feedback circuitry that includes a resistor divider formed by resistors 47A and 47B, reference voltage source 48, and transconductance amplifier 49. Converter 40 also includes NOR gate 60, n-channel FET 62, p-channel FETs 61, 63 and 64, and schottky diodes 67 and 68. Transistors 43–46, 50–53, and 61–64 may be, for example, MOSFETs. Switches S1 and S2 are coupled in a boost arrangement so that converter 40 regulates an output voltage $V_{OUT}$ that is higher than $V_{IN}$.

In circuit 40, switch S4 has been replaced by inverter 41 and current mirror 54, and switch S3 has been replaced by inverter 42 and current mirror 55. Transistors 43 and 44 form current mirror 54, because their gates are coupled together. Transistors 45 and 46 form current mirror 55, because their gates are coupled together. Transistors 44 and 46 may each comprise a single transistor or multiple transistors coupled together in parallel that have effective gate width-to-length areas that are N times the gate width-to-length areas of transistors 43 and 45, respectively. This provides current mirrors 54 and 55 with a current gain of N. Current mirror transistors 43–46 and other current mirror transistors discussed with respect to the present invention may be FETs or BJTs.

Oscillator 25 outputs digital clock signals $V_{CLK}$ and $V_{CLKB}$ as with the previous embodiment of FIG. 3A. Clock signals $V_{CLK}$ and $V_{CLKB}$ oscillate out of phase with a 50% duty cycle (and may have a blanking interval) as shown in FIG. 3B. Clock signal $V_{CLK}$ controls the opening and closing of switch S1, and clock signal $V_{CLKB}$ controls the opening and closing of switch S2.

In the first half of a switch cycle, $V_{CLK}$ is LOW and $V_{CLKB}$ is HIGH. When $V_{CLKB}$ is LOW, transistor 52 is ON, transistor 53 is OFF, and switch S1 is open. When transistor 52 is ON, the output of inverter 42 and the gates of transistors 45 and 46 are HIGH (at $V_{IN}$), causing transistors 45 and 46 to be OFF. This turns OFF current mirror 55. Because $V_{CLKB}$ is HIGH, transistor 50 is OFF, transistor 51 is ON, and switch S2 is closed. When transistor 51 is ON, the gates of transistors 43 and 44 are pulled down by the transconductance amplifier 49 output current $I_{GM}$, turning ON current mirror 54. Transconductance amplifier 49 sinks current $I_{GM}$ through its output. Thus, when transistor 51 is ON, transistor 43 is ON and current $I_{GM}$ flows from $V_{IN}$ through transistors 43 and 51 to ground through the output of transconductance amplifier 49. Transistor 44 is also ON when transistor 51 is ON, and current flows from $V_{IN}$ through transistor 44 charging up capacitor 8.

Because the gate width-to-length area of transistor 44 is N times the gate width-to-length area of transistor 43, the current that flows through transistor 44 equals N times the current $I_{GM}$ that flows through transistor 43. So long as transconductance amplifier 49 sinks a constant current $I_{GM}$ during a steady state load current, the current through transistors 43 and 44, and the input current $I_{IN}$ remains constant while switch S2 is closed. $I_{IN}$ is defined by the following equation when switch S2 is closed:

$$I_{IN}=I_{M43}+I_{M44}=I_{GM}(1+N) \qquad (6)$$

where $I_{M43}$ is the current through transistor 43, $I_{M44}$ is the current through transistor 44, $I_{GM}$ is the output current of amplifier 49, and $I_{M43}$ equals $I_{GM}$ when transistor 43 is ON.

The source of transistor 50 is coupled to the cathodes of schottky diodes 67 and 68 as shown in FIG. 4A. The anode of diode 67 is coupled to $V_{IN}$, and the anode of diode 68 is coupled to $V_{OUT}$. Thus, when transistor 50 is ON, the source of transistor 50 is coupled to the larger of $V_{IN}$ or $V_{OUT}$ through diodes 67 or 68. In circuit 40, $V_{OUT}$ is generally larger than $V_{IN}$, because it is a boost converter.

During the second half of a switch cycle, $V_{CLK}$ is HIGH and $V_{CLKB}$ is LOW. When $V_{CLKB}$ is LOW, transistor 50 is ON, transistor 51 is OFF, and switch S2 is open. When transistor 50 is ON, the output of inverter 41 and the gates of transistors 43 and 44 are HIGH (at $V_{OUT}$), causing transistors 43 and 44 to be OFF. This turns OFF current mirror 54. Because $V_{CLK}$ is HIGH, transistor 52 is OFF, transistor 53 is ON, and switch S1 is closed. When transistor 53 is ON, the gates of transistors 45 and 46 are pulled LOW by the transconductance amplifier 49 output current $I_{GM}$, turning ON current mirror 55. Thus, when transistor 53 is ON, transistor 45 is ON and current $I_{GM}$ flows from $V_{IN}$ through transistors 45 and 53 to ground through the output of transconductance amplifier 49. Transistor 46 is also ON when transistor 53 is ON, causing current to flow from $V_{IN}$ through transistor 46 to capacitor 8, and from capacitor 8 through switch S1 to $V_{OUT}$.

Because the gate width-to-length area of transistor 46 is N times the gate width-to-length area of transistor 45, the current that flows through transistor 46 equals N times the current $I_{GM}$ that flows through transistor 45. So long as transconductance amplifier 49 sinks a constant current $I_{GM}$ during a steady state load current, the current through transistors 45 and 46, and the input current $I_{IN}$ remain constant while switch S1 is closed. $I_{IN}$ is defined by equation (7) when switch S1 is closed:

$$I_{IN}=I_{M45}+I_{M46}=I_{GM}(1+N) \qquad (7)$$

where $I_{M45}$ is the current through transistor 45, $I_{M46}$ is the current through transistor 46, $I_{GM}$ is the output current of amplifier 49, and $I_{M45}$ equals $I_{GM}$ when transistor 45 is ON. As shown by equations (6) and (7), current IN when switch S2 is closed equals current $I_{IN}$ when S1 is closed.

If transconductance amplifier 49 sinks a constant current $I_{GM}$, $I_{IN}$ remains constant when either of switches S1 or S2 are closed and conducting current. Thus, current mirrors 54 and 55 control the current through capacitor 8 and the switches during each phase of the clock signal. During the blanking interval when $V_{CLK}$ and $V_{CLKB}$ are LOW concurrently, and switches S1 and S2 are open, $I_{IN}$ is zero (without NOR gate 60 and transistors 61–64 which are discussed below). Therefore, $I_{IN}$ varies between a constant value and zero every half cycle of $V_{CLK}$ during a steady state as shown, for example, in the graph of FIG. 4B. The circuit of FIG. 4A, therefore, reduces low frequency noise on the input voltage source by maintaining the input current $I_{IN}$ at a constant value when switches S1 and S2 are closed.

The average output current $I_{OUT}$ of converter 40 (i.e., the average current through switch S1 over time) equals the load current $I_L$ during a steady state. When switch S1 is open, the instantaneous output current of converter 40 equals zero. During the other half of the switching cycle, output current flows to $V_{OUT}$ through transistor 46 when S1 is closed. Therefore, the current through transistor 46 must equal twice the load current $I_L$. The current through transistor 46 equals N times $I_{GM}$, as discussed above. The relationship between the load current and $I_{GM}$ is shown by the following equation:

$$I_L=2N \cdot I_{GM} \qquad (8)$$

As the load current changes, $I_{GM}$ can be adjusted by amplifier 49 (discussed below) to match the load current according to equation (8).

The charge that is added to capacitor 8 from $V_{IN}$ when switch S2 is closed equals the charge that is transferred to the load when switch S1 is closed, during a steady state condition. Assuming for purposes of illustration that $R_{DSON}$ of transistors 44 and 46 equals zero, $V_{IN}$ is applied across capacitor 8 when switch S2 is closed. When switch S1 closes, the voltage across capacitor 8 ($V_{IN}$) plus $V_{IN}$ is applied to $V_{OUT}$. Therefore, $V_{OUT}$ equals $2V_{IN}$ in the illustrative case where the $R_{DSON}$ for transistors 44 and 46 equals zero for boost converter 40. This is the maximum value for $V_{OUT}$. As $R_{DSON}$ is increased above zero in a steady state, $V_{OUT}$ becomes less than twice $V_{IN}$. Thus, $V_{OUT}<2V_{IN}$.

The change in voltage across capacitor 8 ($dV_{rx}$) when S2 is closed equals the change in voltage across capacitor 8 ($dV_{ty}$) when S1 is closed. Setting these quantities equal to each other from equation (1) it can be seen that:

$$dV_{tX} = dV_{tY} = \frac{N \cdot I_{GM}}{C_8} t_X = \frac{N \cdot I_{GM}}{C_8} t_Y \quad (9)$$

where $C_8$ is the capacitance of capacitor 8, $I_{GM}$ is the output current of transconductance amplifier 49, $t_x$ is the time period that switch S2 is closed in each switching cycle, and $t_y$ is the time period that switch S1 is closed in each switching cycle. Solving equation (9), it can be seen that $t_x=t_y$. Therefore, the optimum duty cycle for switches S1 and S2 is 50%. Times $t_x$ and $t_y$ are determined by clock signals $V_{CLKB}$ and $V_{CLK}$, respectively.

Circuit 40 regulates the output voltage $V_{OUT}$ to a predetermined value using the feedback loop comprising resistors 47A and 47B, reference voltage source 48, and transconductance amplifier 49. Resistor divider 47A/47B outputs a voltage feedback signal at the inverting input of amplifier 49, and voltage source 48 outputs a constant reference voltage at the non-inverting input of amplifier 49. When $V_{OUT}$ varies from the predetermined value by a certain amount (e.g., due to changes in the load current), the feedback voltage at the inverting input of amplifier 49 varies proportionally to $V_{OUT}$. Amplifier 49 then varies the current $I_{GM}$ and sinks it to ground in response to the changes in the feedback voltage at its inverting input.

When $V_{OUT}$ increases in response to a decrease in the load current, the output current of amplifier 49 decreases so that the current through current mirrors 43/44 and 45/46 decreases in each subsequent cycle. The output current of converter 40 is reduced in each cycle to match the load current and to maintain $V_{OUT}$ at a regulated voltage. When $V_{OUT}$ decreases in response to an increase in the load current, the output current of amplifier 49 increases so that the current through current mirrors 43/44 and 45/46 increases in each subsequent cycle. The output current of converter 40 increases in each cycle to match the load current and to maintain $V_{OUT}$ at a regulated voltage.

Figure 4B:
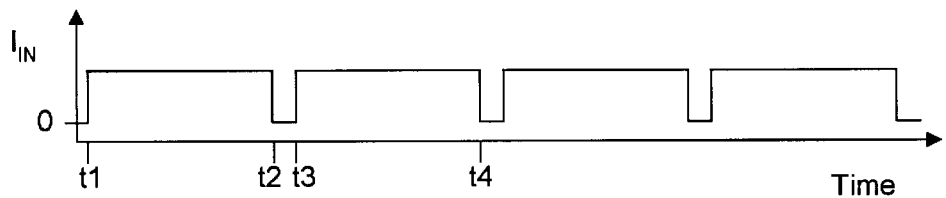
FIG. 4B is a graph of the input current for the boost charge pump DC/DC converter of FIG. 4A.

Because charge is only transferred to output capacitor 9 every half cycle of $V_{CLK}$ when switch S1 is closed, $V_{OUT}$ oscillates up and down during every cycle due to the presence of equivalent series resistance 12 and the charging and discharging of capacitor 9 in the output circuit. If the switching frequency is not much higher than the pole set by output capacitor 9 and load 11, the output current of amplifier 49 also ripples up and down with the output voltage in each switching cycle. This causes a triangle shaped waveform of input current $I_{IN}$ which increases noise at the input voltage source. To reduce this ripple current effect, the output capacitor 9 or the switching frequency can be increased to reduce output voltage ripple. Reducing the output voltage ripple can provide a substantially constant input current when switches S1 or S2 are closed (during a steady state), as shown in FIG. 4B.

Charge pump DC/DC converters of the present invention may also shunt input current $I_{IN}$ to ground during the blanking intervals to produce a more constant IN during each cycle. An example of circuitry that may be added to a DC/DC converter of the present invention is shown in FIG. 4A. NOR gate 60 and FET transistors 61–64 may be added to charge pump 40 as shown in FIG. 4A to shunt current to ground during the blanking intervals.

Blanking intervals occur twice during each period of the clock signals when both $V_{CLK}$ and $V_{CLKB}$ are LOW concurrently as shown in FIG. 3B. When either $V_{CLK}$ and $V_{CLKB}$ are HIGH, the output of NOR gate 60 is LOW causing transistor 61 to be ON and transistor 62 to be OFF. Transistors 61 and 62 form an inverter. When p-channel transistor 61 is ON, p-channel transistors 63 and 64 are OFF, because the gates of transistors 63 and 64 are pulled HIGH. Transistors 63 and 64 form a current mirror, because their gates are coupled together. N is the current gain ratio of transistor 64 to transistor 63. Thus, N is the gate width-to-length ratio of transistor pairs 64 to 63, 44 to 43, and 46 to 45.

Figure 4C:
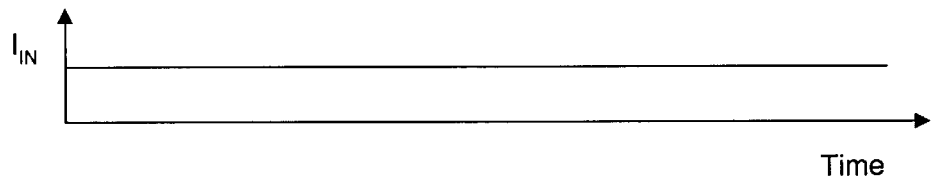
FIG. 4C is another graph of the input current for the boost charge pump DC/DC converter of FIG. 4A.

The source of transistor 62 is coupled to the output of transconductance amplifier 49. When both $V_{CLK}$ and $V_{CLKB}$ are LOW concurrently, the output of NOR gate 60 is HIGH, causing N-channel FET 62 to be ON and p-channel FET 61 to be OFF. When transistor 62 is ON, amplifier 49 sinks current to ground through transistor 62, turning transistors 63 and 64 ON. When transistor 62 is ON, $I_{GM}$ flows from $V_{IN}$ through transistors 63 and 62 and to ground through the output of amplifier 49. Also, when transistor 62 is ON, current flows from $V_{IN}$ through transistor 64 to ground. Therefore, $I_{IN}$ is defined by the following equation during the blanking intervals with circuitry 60–64:

$$I_{IN}=I_{M63}+I_{M64}=I_{GM}(1+N) \quad (10)$$

where $I_{M63}$ is the current through transistor 63 and $I_{M64}$ is the current through transistor 64. Therefore $I_{IN}$ during the blanking interval equals $I_{IN}$ when S1 is closed and when S2 is closed. Current $I_{IN}$ flows continuously throughout each switching cycle and is substantially constant during a steady state as shown in FIG. 4C (with circuitry 60–64). The gate capacitance of transistors 63 and 64 should not be too large so that these transistors can turn ON quickly during the relatively brief blanking intervals.

Figure 5A:
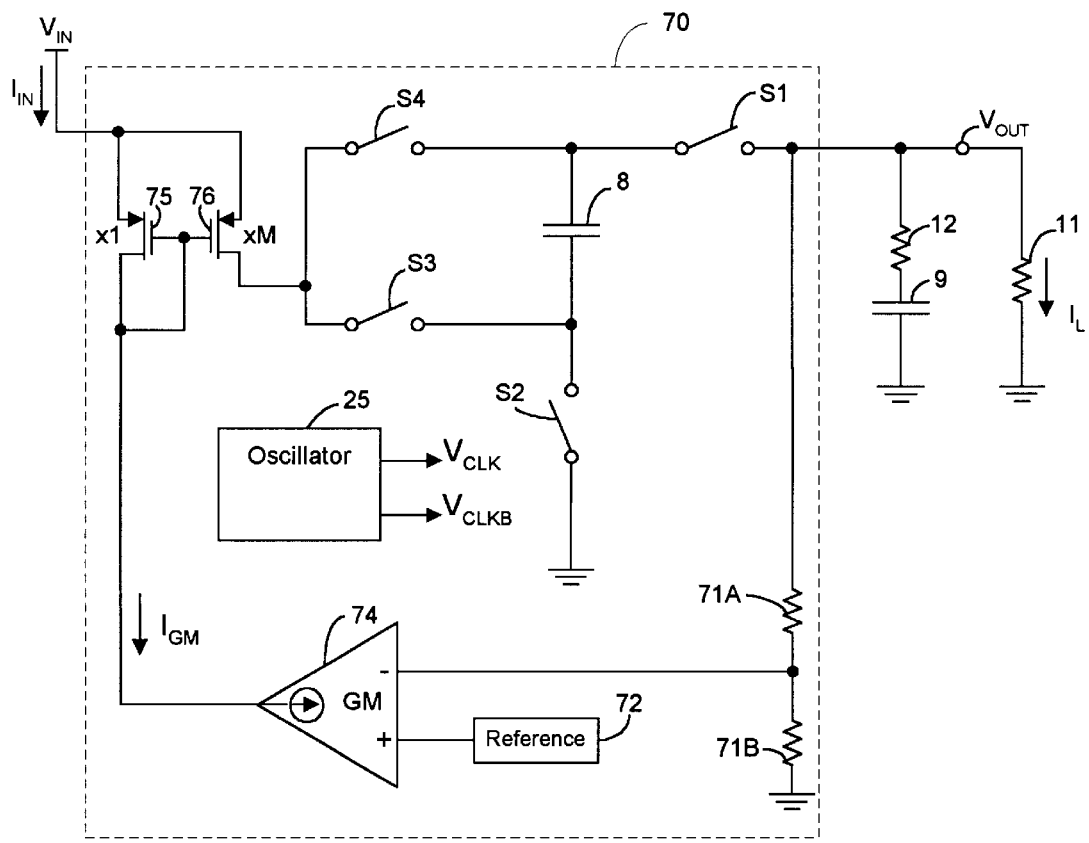
FIG. 5A is a schematic of another boost charge pump DC/DC converter of the present invention.

A further embodiment of the present invention is illustrated in FIG. 5A. Charge pump DC/DC converter 70 includes oscillator 25, p-channel FETs 75 and 76, resistors 71A and 71B, reference voltage source 72, transconductance amplifier 74, capacitor 8, and switches S1, S2, S3, and S4. Switches S1–S4 are coupled in a boost arrangement so that converter 70 regulates an output voltage $V_{OUT}$ that is higher than $V_{IN}$. Transistors 75 and 76 form a current mirror, because their gates are coupled together and to the output of transconductance amplifier 74. Transistor 76 conducts M times the current conducted by transistor 75, because M is the current gain ratio of transistors 76 to 75.

Switches S2 and S4 are switched out of phase with switches S1 and S3 in each switching cycle by oscillator 25 as with the previous embodiments. The time that switches S2/S4 are ON equals the time that switches S1/S3 are ON, as with the previous embodiment. Thus, switches S1–S4 each have a 50% duty cycle.

When switches S4 and S2 are closed, current flows from $V_{IN}$ to capacitor 8 through transistor 76 and switch S4. When switches S3 and S1 are closed, current flows from $V_{IN}$ to capacitor 8 through transistor 76 and switch S3, and from capacitor 8 through switch S1 to $V_{OUT}$. Input current $I_{IN}$ equals the current through transistor 75 plus the current through transistor 76. A continuous current flows through transistor 75 that equals the output current $I_{GM}$ of transconductance amplifier 74. The current through transistor 75 is independent of the switch states of switches S1–S4. When either of switches S3 or S4 are closed, a current flows through transistor 76 from $V_{IN}$. That current equals M times the current $I_{GM}$ through transistor 75.

Figure 5B:
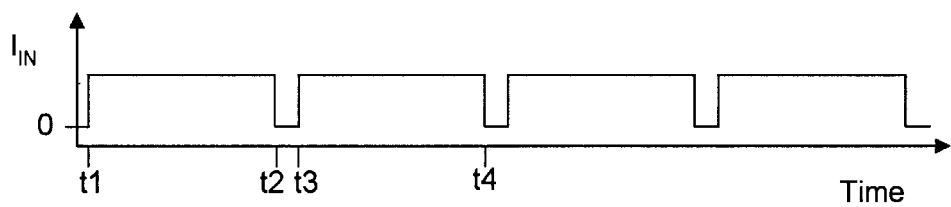
FIG. 5B is a graph of the input current for he boost charge pump DC/DC converter of FIG. 5A.

The current through transistor 76 is substantially constant as long as the current $I_{GM}$ through transistor 75 is constant, because M is a constant. Transconductance amplifier 74 sinks a constant current $I_{GM}$ to ground during a steady state as long as the switching frequency is much higher than the pole caused by capacitor 9 and load 11. Therefore, the current through transistors 75 and 76 and $I_{IN}$ remains constant during a steady state. The current through transistor 75 is typically a small fraction (1/M) of the current through transistor 76 (e.g., M=100). Therefore, $I_{IN}$ equals approximately M times $I_{GM}$, except during the blanking intervals when $I_{IN}$ equals zero. An example $I_{IN}$ waveform during a steady state is shown in FIG. 5B. Current mirror 75/76 controls the current through capacitor 8 and the four switches during each phase of the clock cycle.

The average output current $I_{OUT}$ of converter 70 (i.e., the average current through switch S1 over time) equals the load current $I_L$ during a steady state. When switch S1 is open, the instantaneous output current of converter 70 equals zero. During the other half of the switching cycle, output current flows to $V_{OUT}$ through transistor 76 when S1/S3 are closed. Therefore, the average current through transistor 76 must equal twice the average output current $I_{OUT}$. The relationship between the load current and $I_{GM}$ is shown by the following equation:

$$I_L = 2M \cdot I_{GM} \qquad (11)$$

The maximum value for $V_{OUT}$ in converter 70 equals $2V_{IN}$ in the illustrative case where the $R_{DSON}$ for transistor 76 equals zero, as with the previous embodiment.

Resistors 71A and 71B form a resistor divider that outputs a voltage feedback signal proportional to $V_{OUT}$ at the inverting input of transconductance amplifier 74. Reference voltage source 72 outputs a constant voltage at the non-inverting input of amplifier 74. Transconductance amplifier 74 varies the amount of current it sinks to ground through transistor 75 as the voltage feedback signal at its inverting input changes in order to regulate $V_{OUT}$.

The output current of DC/DC converter 70 varies with output current $I_{GM}$ of amplifier 74 to match the load current. When $V_{OUT}$ increases, transconductance amplifier 74 decreases $I_{GM}$, causing the current through transistor 76 and the output current of converter 70 to decrease. When $V_{OUT}$ decreases, transconductance amplifier 74 increases $I_{GM}$, causing the current through transistor 76 and the output current of converter 70 to increase. Amplifier 74 causes the current through transistors 75 and 76 to increase or decrease so that the average output current of converter 70 equals the load current by monitoring the voltage feedback signal.

Figure 6A:
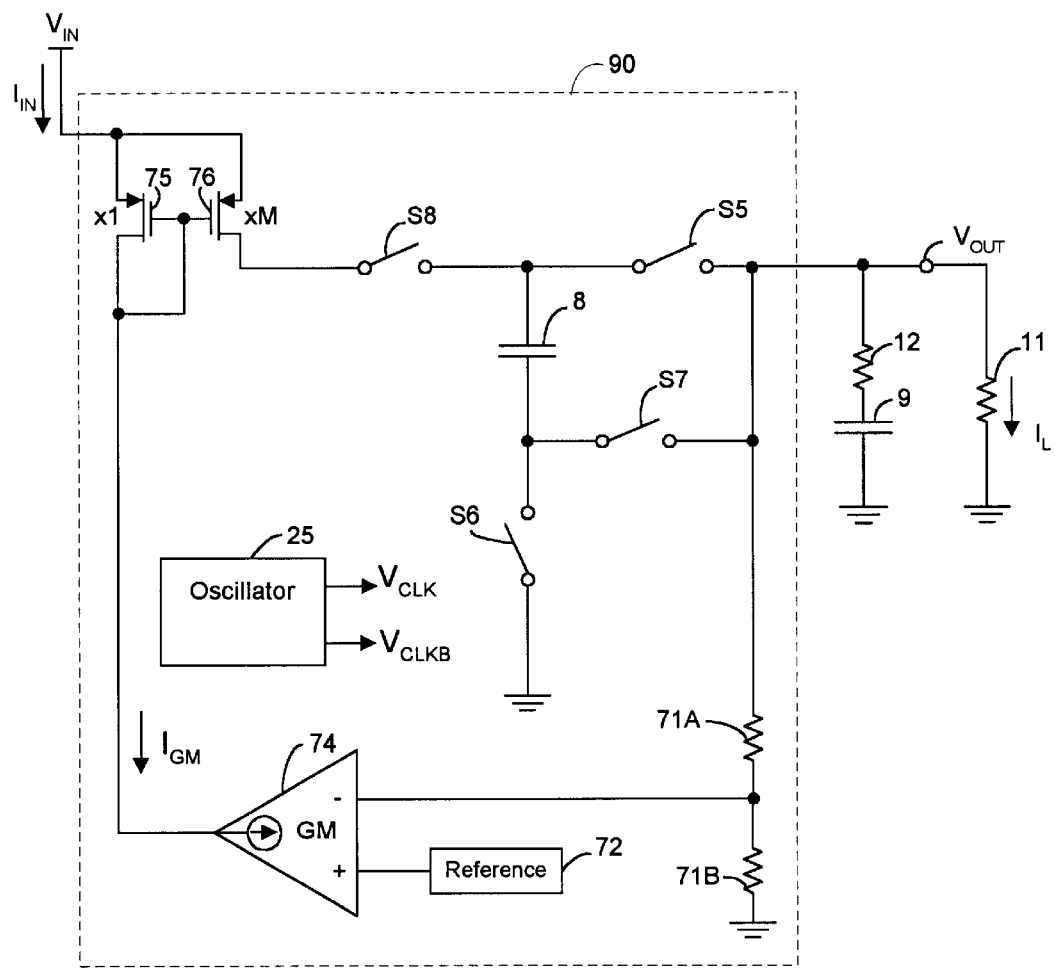
FIG. 6A is a schematic of a buck charge pump C/DC converter.

A further charge pump DC/DC converter is shown in FIG. 6A. Charge pump DC/DC converter 90 includes oscillator 25, current mirror transistors 75 and 76, reference voltage source 72, transconductance amplifier 74, capacitor 8, resistors 71A and 71B, and switches S5, S6, S7, and S8. Switches S5–S8 are coupled in a buck arrangement so that DC/DC converter 90 provides an output voltage $V_{OUT}$ that is lower than input voltage $V_{IN}$. Resistors 71A/71B, reference 72, transconductance amplifier 74, and mirror transistors 75 and 76 operate to regulate $V_{OUT}$ as discussed above with respect to boost converter 70 in FIG. 5A. Transconductance amplifier 74 sets its output current $I_{GM}$ to adjust the output current of converter 90 based on the voltage feedback signal at its inverting input.

Figure 6B:
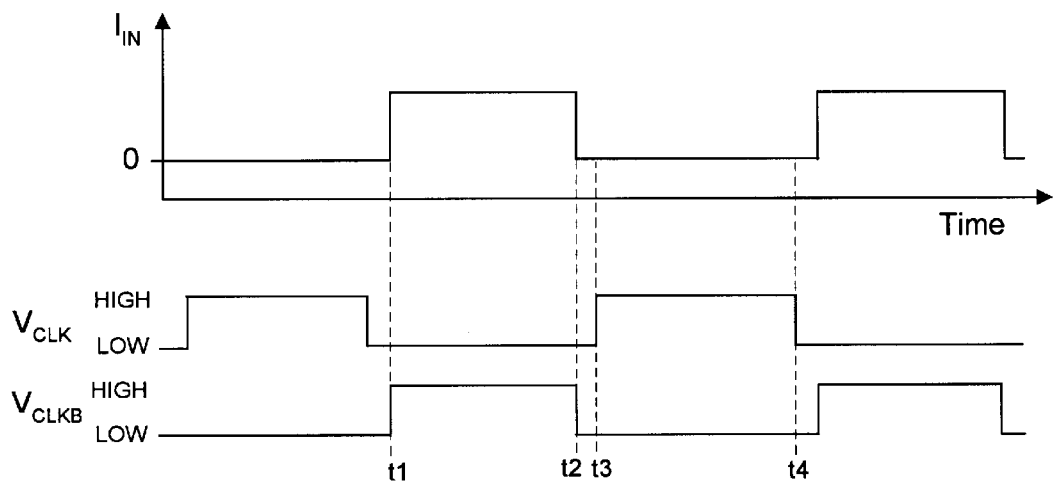
FIG. 6B is a graph of the input current and lock signals for the buck charge pump DC/DC converter of FIG. 6A.

In buck charge pump DC/DC converter 90, switches S5 and S6 are closed together while switches S7 and S8 are open in the first phase of each switching cycle, and switches S7 and S8 are closed together while switches S5 and S6 are open in the second phase of each switching cycle. Switches S5–S8 each have a 50% duty cycle. Switches S5 and S6 are closed when $V_{CLK}$ is HIGH and open when $V_{CLK}$ is LOW. Switches S7 and S8 are closed when $V_{CLKB}$ is HIGH and open when $V_{CLKB}$ is LOW. The clock signals are shown in FIG. 6B.

When switches S5 and S6 are closed, capacitor 8 is coupled to $V_{OUT}$ through switch S5 and to ground through switch S6. Therefore, the voltage on capacitor 8 equals $V_{OUT}$. Switches S7 and S8 are closed after switches S5 and S6 open. Capacitor 8 is then coupled to the drain of transistor 76 through switch S8 and to $V_{OUT}$ through switch S7. Current flows from $V_{IN}$ to capacitor 8 through switch S8 and transistor 76, and current flows from capacitor 8 through switch S7 to load 11. The voltage drop across capacitor 8 is still at $V_{OUT}$ when switches S7 and S8 close. The voltage on the upper plate of capacitor 8 (coupled to switch S8) rises to $2V_{OUT}$, because the lower plate of capacitor 8 is coupled to $V_{OUT}$ through switch S7. The voltage across transistor 76 is now $V_{IN}$–$2V_{OUT}$. Therefore, the regulated value of $V_{OUT}$ must be less than or equal to one half of $V_{IN}$ so that current does not flow from $V_{OUT}$ to $V_{IN}$ ($V_{OUT} \leq V_{IN}/2$).

The current through transistor 76 is substantially constant as long as the current through transistor 75 ($I_{GM}$) is constant, and the switching frequency is much higher than the pole caused by capacitors 9 and 11, as discussed above. Therefore, the current through transistor 76 and $I_{IN}$ remains constant during a steady state when S8 is closed. An example $I_{IN}$ waveform during a steady state is shown in FIG. 6B. $I_{IN}$ is approximately zero when $V_{CLKB}$ is LOW, because switch S8 is open, transistor 76 is OFF, and the current through transistor 75 is negligible (e.g., between t2 and t4).

The average output current $I_{OUT}$ of converter 90 equals the load current $I_L$ during a steady state. Output current flows to $V_{OUT}$ from capacitor 8 during each half of the switching cycle when S5 is closed and when S7 is closed. The output current of converter 90 equals the current through transistor 76 when it is ON ($V_{CLKB}$ HIGH). The current through transistor 76 when it is ON equals approximately M times $I_{GM}$, as discussed above. The relationship between the load current and $I_{GM}$ is shown by equation (12):

$$I_L = M \cdot I_{GM} \qquad (12)$$

The feedback loop (comprising amplifier 74, resistor divider 71A/71B, and reference 72) determines the output current of converter 90 by varying output current $I_{GM}$ according to equation (12) so that the current through transistor 76 when it is ON equals $I_L$.

Current mirror transistor 76 sets the amount of current that flows to capacitor 8 when switches S7 and S8 are closed, thereby providing a substantially constant current $I_{IN}$, as shown in FIG. 6B between times t1 and t2. Converter 90 therefore reduces noise at the input voltage by providing a more constant input current when switch S8 is closed.

Figure 7A:
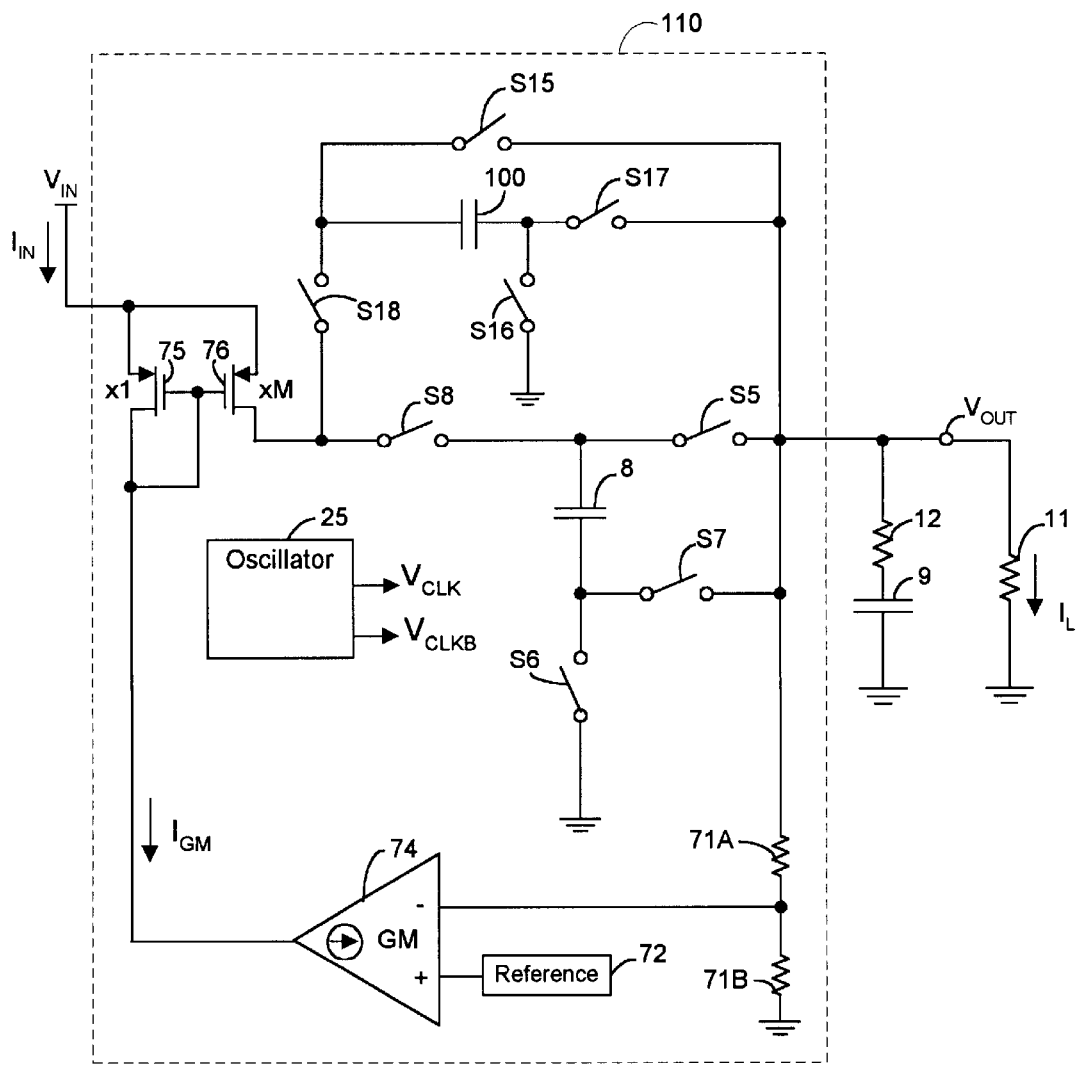
FIG. 7A is a schematic of a buck charge pump DC/DC converter of the present invention.

A further embodiment of the present invention is illustrated in FIG. 7A. Charge pump DC/DC converter 110 in FIG. 7A supplies output current to load 11 to regulate output voltage $V_{OUT}$. Charge pump 110 includes resistors 71A and 71B, transconductance amplifier 74, reference voltage source 72, current mirror transistors 75 and 76, oscillator 25, capacitors 8 and 100, and switches S5, S6, S7, S8, S15, S16, S17, and S18. Switches S5–S8 and switches S15–S18 comprise two buck DC/DC converters that are coupled in parallel with each other between the drain of transistor 76 and $V_{OUT}$. In buck charge pump DC/DC converter 110, switches S5–S8, oscillator 25, transconductance amplifier 74, reference 72, and resistor divider 71A/71B operate as discussed above with respect to FIG. 6A.

Switches S15/S16 are switched out of phase with switches S5/S6, and switches S17/S18 are switched out of phase with switches S7/S8. Switches S7, S8, S15 and S16 are closed when $V_{CLKB}$ is HIGH and open when $V_{CLKB}$ is LOW. Switches S5, S6, S17, and S18 are closed when $V_{CLK}$ is HIGH, and open when $V_{CLK}$ is LOW. Switches S15–S18 each have a 50% duty cycle.

When switches S15 and S16 are closed, capacitor 100 is coupled to $V_{OUT}$ through switch S15 and to ground through switch S16. Therefore the voltage on capacitor 100 equals $V_{OUT}$. Switches S17 and S18 are closed after switches S15 and S16 open. Capacitor 100 is then coupled to transistor 76 through switch S18 and to $V_{OUT}$ through switch S17. Current flows from $V_{IN}$ to capacitor 100 through transistor 76 and switch S18, and current flows from capacitor 100 through switch S17 to load 11. Because the voltage drop across a capacitor cannot change instantaneously, the voltage drop across capacitor 100 is still $V_{OUT}$ at the moment that switches S17 and S18 close. The voltage on the left plate of capacitor 100 (coupled to switch S18) rises to $2V_{OUT}$, because the right plate of capacitor 100 is coupled to $V_{OUT}$ through switch S17. Therefore, $V_{OUT}$ must be less than or equal to one half of the voltage of $V_{IN}$ for DC/DC converter 110 to properly regulate $V_{OUT}$ ($V_{OUT} \leq V_{IN}/2$), as with converter 90.

By inspection, it can be seen that converter 110 has two charge pump DC/DC converters working in parallel: switches S5–S8 and switches S15–S18. Each converter provides one half of the required load current $I_L$. The current through transistor 76 (M·$I_{GM}$) charges up capacitor 8 with one half of the load current when S8 is closed (S18 open). The current through transistor 76 (M·$I_{GM}$) charges up capacitor 100 with one half of the load current when S18 is closed (S8 open). Thus, the load current is determined by the following equation:

$$I_L = \frac{M \cdot I_{GM}}{2} \qquad (13)$$

The input current $I_{IN}$ is continuously flowing from $V_{IN}$ through transistor 76 during each half cycle except during the blanking intervals. The input current $I_{IN}$ is constant as long as $I_{GM}$ is constant as shown by the following equation:

$$I_{IN} = (M+1) \cdot I_{GM} \qquad (14)$$

Figure 7B:
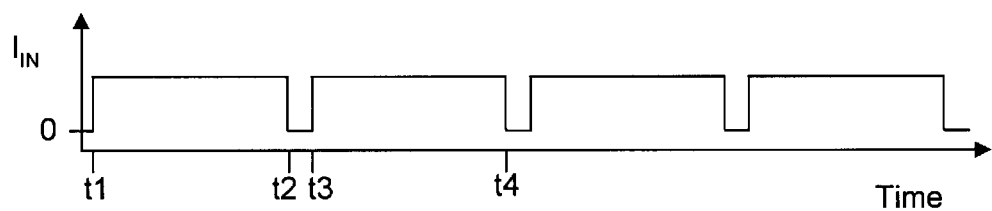
FIG. 7B is a graph of the input current for the buck charge pump DC/DC converter of FIG. 7A.

A graph of $I_{IN}$ is shown in FIG. 7B. Current mirror transistors 75/76 provide a constant input current $I_{IN}$ during each phase of the switching cycle thereby reducing noise at the input voltage source.

Figure 8A:
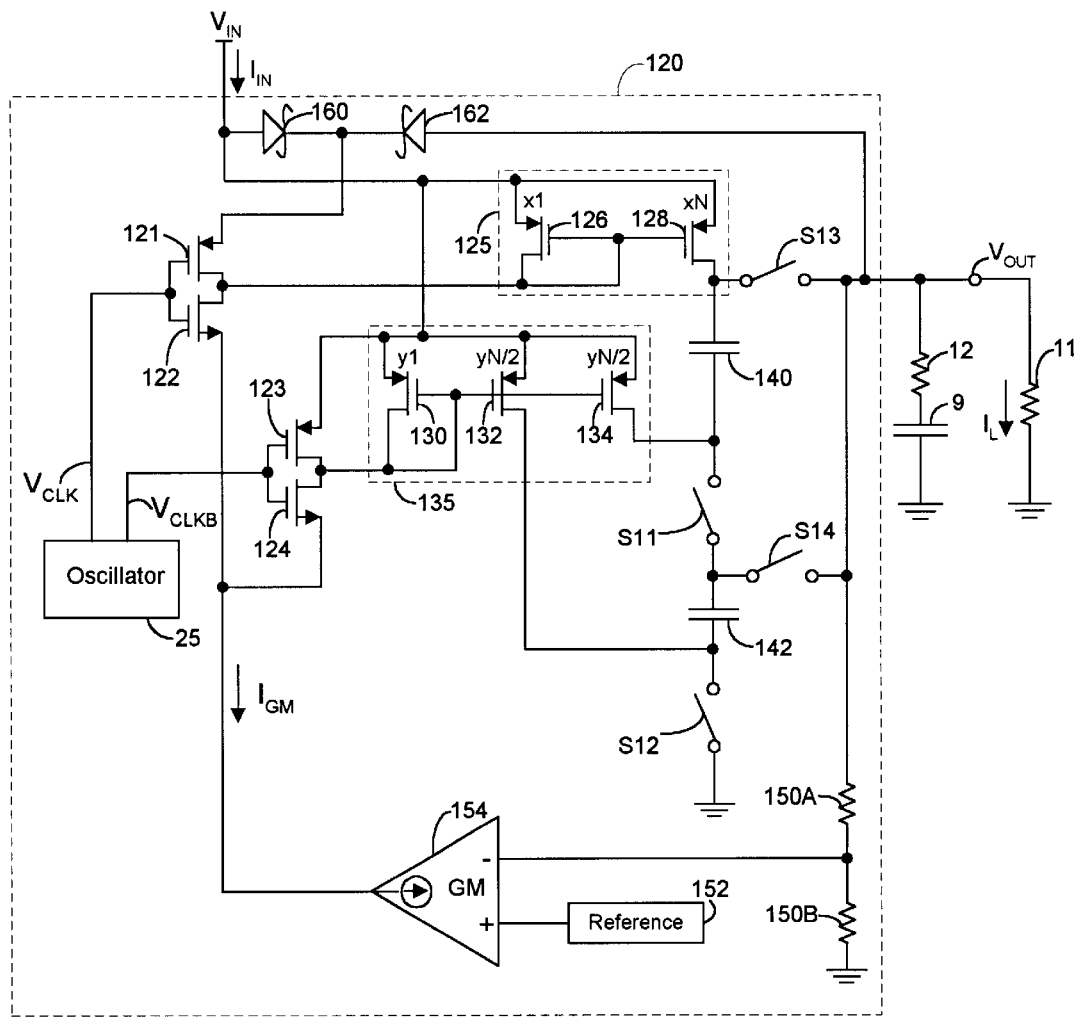
FIG. 8A is a schematic of another boost charge pump DC/DC converter of the present invention.

A further embodiment of a boost charge pump DC/DC converter of the present invention is illustrated in FIG. 8A. Converter 120 in FIG. 8A includes oscillator 25, an inverter formed by P-channel FET 121 and N-channel FET 122, an inverter formed by P-channel FET 123 and N-channel FET 124, current mirror 125 that includes P-channel FETs 126 and 128, current mirror 135 that includes P-channel FETs 130, 132 and 134, capacitors 140 and 142, switches S11, S12, S13, and S14, resistors 150A and 150B, reference voltage source 152, transconductance amplifier 154, and schottky diodes 160 and 162.

Transistors 126 and 128 form a current mirror because their gates are coupled together. Transistors 130, 132, and 134 form a current mirror because their gates are coupled together. N is the current gain ratio of transistor 128 to transistor 126. N/2 is the current gain ratio of transistors 132 and 134 to transistor 130.

The source of transistor 121 is coupled to the cathodes of schottky diodes 160 and 162 as shown in FIG. 8A. The anode of diode 160 is coupled to $V_{IN}$, and the anode of diode 162 is coupled to $V_{OUT}$. Thus, when transistor 121 is ON, the source of transistor 121 is coupled to the larger of $V_{IN}$ or $V_{OUT}$ through diodes 160 or 162. In circuit 120, $V_{OUT}$ is generally larger than $V_{IN}$, because it is a boost converter so that transistor 121 is coupled to $V_{OUT}$ when it conducts current.

Figure 8B:
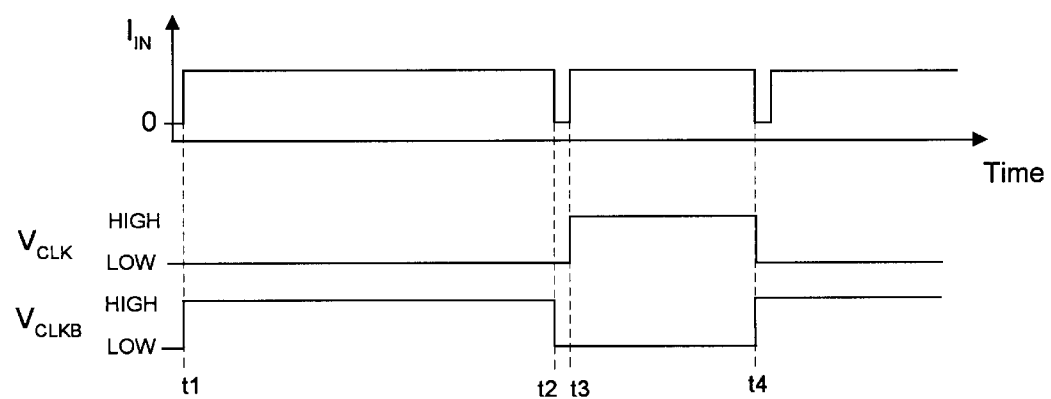
FIG. 8B is a graph of the input current and clock signals for the boost charge pump DC/DC converter of FIG. 8A.

Oscillator 25 outputs digital clock signals $V_{CLK}$ and $V_{CLKB}$. Clock signals $V_{CLK}$ and $V_{CLKB}$ may have a blanking interval as shown in FIG. 8B. Clock signal $V_{CLK}$ controls the opening and closing of switches S11 and S12, and clock signal $V_{CLKB}$ controls the opening and closing of switches S13 and S14. When $V_{CLKB}$ is LOW, transistor 123 is ON, transistor 124 is OFF, and switches S13 and S14 are open. When transistor 123 is ON, the output of inverter 123/124 and the gates of P-channel transistors 130, 132, and 134 are HIGH (at $V_{IN}$), causing transistors 130, 132, and 134 to be OFF. When $V_{CLK}$ is HIGH, transistor 121 is OFF, transistor 122 is ON, and switches S11 and S12 are closed. When transistor 122 is ON, the gates of transistors 126 and 128 are pulled down by the output current $I_{GM}$ of transconductance amplifier 154. Thus, when transistor 122 is ON, transistor 126 is ON and current $I_{GM}$ flows from $V_{IN}$ through transistors 126 and 122 to ground through the output of transconductance amplifier 154. $I_{GM}$ is the output current of amplifier 154. Transistor 128 is also ON when transistor 126 is ON, causing current N·$I_{GM}$ to flow from $V_{IN}$ through transistor 128 and charging up capacitors 140 and 142.

When $V_{CLK}$ is LOW, transistor 121 is ON, transistor 122 is OFF, and switches S11 and S12 are open. When transistor 121 is ON, the output of inverter 121/122 and the gates of transistors 126 and 128 are HIGH (at $V_{OUT}$), causing transistors 126 and 128 to be OFF. When $V_{CLKB}$ is HIGH, transistor 123 is OFF, transistor 124 is ON, and switches S13 and S14 are closed. When transistor 124 is ON, the gates of transistors 130, 132, and 134 are pulled down by the output current $I_{GM}$ of transconductance amplifier 154. Thus, when transistor 124 is ON, transistor 130 is ON and current $I_{GM}$ flows from $V_{IN}$ through transistors 130 and 124 to ground through the output of transconductance amplifier 154. Transistors 132 and 134 are also ON when transistor 130 is ON. A current equal to N·$I_{GM}$/2 flows from $V_{IN}$ through transistor 132 and capacitor 142 to $V_{OUT}$. A current equal to N·$I_{GM}$/2 also flows from $V_{IN}$ through transistor 134 and capacitor 140 to $V_{OUT}$.

Because the gate width-to-length ratio of transistor 128 is N times the gate width-to-length ratio of transistor 126, the current that flows through transistor 128 equals N times the current $I_{GM}$ that flows through transistor 126. So long as transconductance amplifier 154 sinks a constant current during a steady state load current, the current through transistors 126 and 128, and the input current $I_{IN}$ remains constant while switches S11 and S12 are closed. $I_{IN}$ is defined by the following equation when switches S11 and S12 are closed, where $I_{GM}$ is the current through transistor 126 and $I_{M128}$ is the current through transistor 128:

$$I_{IN} = I_{GM} + I_{M128} = I_{GM}(1+N) \qquad (15)$$

Because the gate width-to-length area of transistors 132 and 134 are each N/2 times the gate width-to-length area of transistor 130, the current that flows through each of transistors 132 and 134 equals N/2 times the current $I_{GM}$ that flows through transistor 130. So long as transconductance amplifier 154 sinks a constant current during a steady state load current, the current through transistors 130, 132 and 134, and the input current $I_{IN}$ remain constant while switches S13 and S14 are closed. $I_{IN}$ is defined by equation (16) when switches S13 and S14 are closed, where $I_{GM}$ is the current through transistor 130, $I_{M132}$ is the current through transistor 132, and $I_{M134}$ is the current through transistor 134:

$$I_{IN}=I_{GM}+I_{M132}+I_{M134}=I_{GM}(1+N) \quad (16)$$

Thus, if transconductance amplifier 154 sinks a constant current $I_{GM}$, $I_{IN}$ remains constant when switches S11/S12 or S13/S14 are closed.

During the blanking interval when $V_{CLK}$ and $V_{CLKB}$ are LOW concurrently, and switches S1 and S2 are open, $I_{IN}$ is zero. Therefore, $I_{IN}$ varies between a constant value and zero twice during every cycle of the clock signals during a steady state as shown, for example, in the graph of FIG. 8B. The circuit of FIG. 8A, therefore, reduces low frequency noise at the input voltage source by maintaining the input current $I_{IN}$ at a constant value when switches S11/S12 or S13/S14 are closed.

The charge that is added to capacitor 140 from $V_{IN}$ when switches S11 and S12 are closed equals the charge that is transferred to the load when switches S13 and S14 are closed, during a steady state condition. Therefore, the change in voltage across capacitor 140 ($dV_{tA}$) when S11 and S12 are closed equals the change in voltage across capacitor 140 ($dV_{tB}$) when S13 and S14 are closed. Setting these quantities equal to each other from equation (1) it can be seen that:

$$dV_{t1}=dV_{t2}=\frac{N \cdot I_{GM}}{C_{140}}t_A=\frac{\frac{N}{2} \cdot I_{GM}}{C_{140}}t_B \quad (17)$$

where $C_{140}$ is the capacitance of capacitor 140, $t_A$ is the time period that switches S11 and S12 are closed in each switching cycle, and $t_B$ is the time period that switches S13 and S14 are closed in each switching cycle. Times $T_A$ and $T_B$ are determined by clock signals $V_{CLK}$ and $V_{CLKB}$, respectively, that are shown for example, in FIG. 8B. Solving equation (17), it can be seen that $T_B=2T_A$. Therefore, switches S13 and S14 are closed twice as long as switches S11 and S12 are closed in each switching cycle.

Assuming for purposes of illustration that the $R_{DSON}$ of transistors 128, 132 and 134 equals zero, $V_{IN}$ is applied across capacitors 140 and 142 when switches S11 and S12 are closed. One half of $V_{IN}$ drops across capacitor 140, and one half of $V_{IN}$ drops across capacitor 142. When switch S13 and S14 close, the voltage across capacitor 140 ($V_{IN}/2$) plus $V_{IN}$ is applied to $V_{OUT}$. Also, the voltage across capacitor 142 ($V_{IN}/2$) plus $V_{IN}$ is applied to $V_{OUT}$. Therefore, $V_{OUT}$ equals 3⁄2 times $V_{IN}$ in the illustrative case where the $R_{DSON}$ for transistors 128, 132, and 134 equals zero for boost converter 120. This is the maximum value for $V_{OUT}$. When $R_{DSON}$ is increased above zero in a steady state, $V_{OUT}$ becomes less than $3V_{IN}/2$. Thus, $V_{OUT} \leq 3V_{IN}/2$. As the load current changes, $I_{GM}$ can be adjusted by amplifier 154 (discussed below) to maintain the same input-to-output voltage ratio.

To achieve a constant input current in each phase of the clock signal in boost converters of the present invention, the duty cycle ratio of at least one of the switches is selected to be equal to the minimum input-to-output voltage ratio. For example, minimum input-to-output voltage ratio of circuit 20 is 2⁄3 of that in circuit 120 of FIG. 8A. The duty cycle ratio of switches S13/S14 is also 2⁄3 with respect to the switching period. The duty cycle ratio of the switches may be selected to obtain a different input-to-output voltage ratio and to achieve constant input current.

The average output current $I_{OUT}$ of converter 120 equals the load current $I_L$ during a steady state condition. The output current of converter 120 is zero when switches S13 and S14 are open, because there is no current path to the output node. The output current of converter 120 equals N times $I_{GM}$ (the current through transistor 132 plus the current through transistor 134) when switches S13 and S14 are closed. Switches S13 and S14 are closed during 2⁄3 of the time period of each cycle as stated above. Therefore, the load current $I_L$ is defined by the following equation:

$$I_L = \tfrac{2}{3}N \cdot I_{GM} = \tfrac{2}{3}I_{IN} \quad (18)$$

where N is substantially larger than 1 (e.g., N=100), and thus $I_{IN}$ equals N times $I_{GM}$.

Circuit 120 regulates the output voltage $V_{OUT}$ to a predetermined value using the feedback loop circuitry comprising resistors 150A and 150B, reference voltage source 152, and transconductance amplifier 154. The feedback loop in converter 120 operates to adjust the output current to match $I_L$ by varying $I_{GM}$ in response to changes in $V_{OUT}$ in the same fashion as the feedback loop comprising resistors 71A/71B, reference 72, and transconductance amplifier 74 in the pervious embodiments.

Figure 9A:
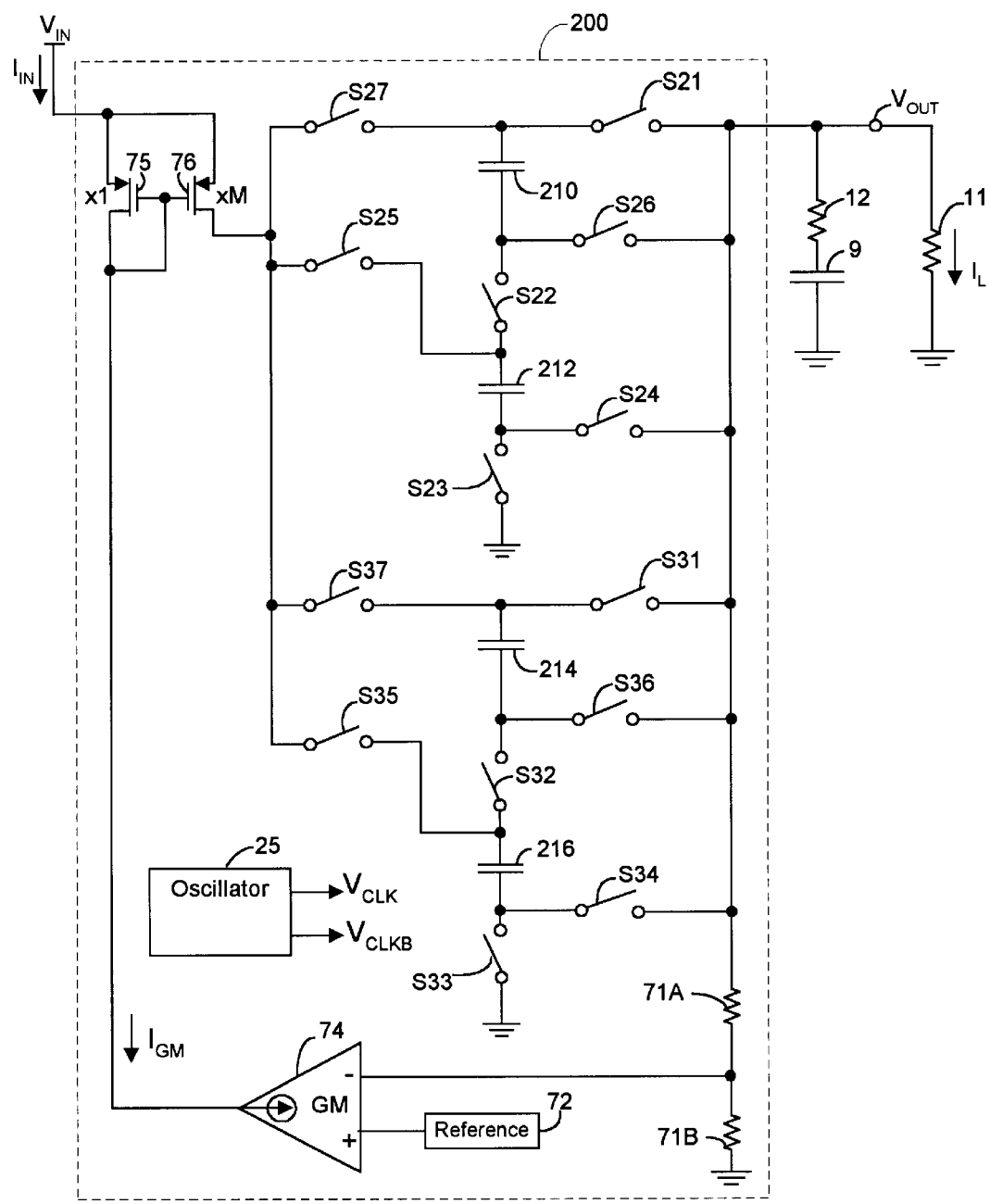
FIG. 9A is a schematic of another buck charge pump DC/DC converter of the present invention.

A further embodiment of a buck charge pump DC/DC converter of the present invention is illustrated in FIG. 9A. Converter 200 in FIG. 9A includes oscillator 25, current mirror transistors 75/76, two buck charge pumps coupled in parallel, and feedback loop circuitry that comprises resistors 71A and 71B, reference voltage source 72, and transconductance amplifier 74. The first buck charge pump comprises capacitors 210 and 212, and switches S21, S22, S23, S24, S25, S26, and S27. The second buck charge pump comprises capacitors 214 and 216, and switches S31, S32, S33, S34, S35, S36, and S37. Switches S21/S22/S23 are switched out of phase with switches S24/S25/S26/S27, and switches S31/S32/S33 are switched out of phase with switches S34/S35/S36/S37 by the clock signals. Switches S21/S22/S23 are switched out of phase with switches S31/S32/S33, and switches S24/S25/S26/S27 are switched out of phase with switches S34/S35/S36/S37. Each of switches S21–S27 and S31–S37 have a 50% duty cycle.

Figure 9B:
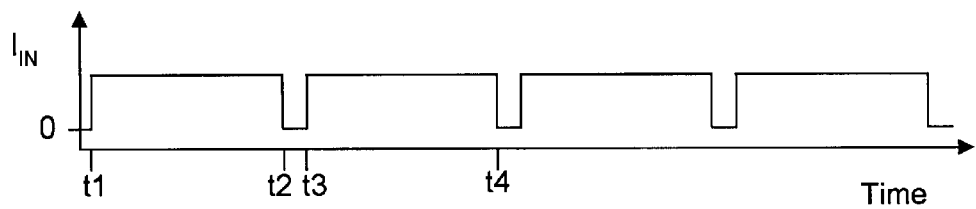
FIG. 9B is a graph of the input current for the buck charge pump DC/DC converter of FIG. 9A.

Oscillator 25 outputs digital clock signals $V_{CLK}$ and $V_{CLKB}$. Clock signals $V_{CLK}$ and $V_{CLKB}$ may have a blanking interval. Clock signal $V_{CLKB}$ controls the opening and closing of switches S21/S22/S23 and switches S34/S35/S36/S37. Clock signal $V_{CLKB}$ controls the opening and closing of switches S24/S25/S26/S27 and switches S31/S32/S33. Switches S21/S22/S23 and S34/S35/S36/S37 are closed when $V_{CLK}$ is HIGH and open when $V_{CLK}$ is LOW. Switches S24/S25/S26/S27 and S31/S32/S33 are closed when $V_{CLKB}$ is HIGH and open when $V_{CLKB}$ is LOW. Switches S24/S25/S26/S27 are closed during one phase of the clock signals and switches S34/S35/S36/S37 are closed during the other phase of the clock signals. Thus, the two buck charge pumps S21–S27 and S31–S37 coupled in parallel provide a constant input current $I_{IN}$ during each phase of the clock signals as shown, for example, in FIG. 9B (except during the blanking intervals). Illustrative waveforms for clock signals $V_{CLK}$ and $V_{CLKB}$ in converter 200 are shown in FIG. 9B.

The input current through current mirror transistors 75 and 76 is constant and is set by output current $I_{GM}$ of transconductance amplifier 74, as discussed above with respect to FIG. 5A. Because each charge pump S21–S27 and S31–S37 provides one half of the required load current $I_L$, the load current for converter 200 is defined by equation (13) during a steady state.

$V_{OUT}$ is applied across capacitors 210 and 212 when switches S21, S22, and S23 are closed. One half of $V_{OUT}$ drops across capacitor 210 and one half of $V_{OUT}$ drops across capacitor 212. When switches S21–S23 open and switches S24–S27 close, capacitors 210 and 212 are both coupled between $V_{IN}$ and $V_{OUT}$. A voltage equal to $V_{OUT}/2$ now drops across capacitors 210 and 212 relative to $V_{OUT}$. Therefore, the voltage across transistor 76 equals $V_{IN}-3V_{OUT}/2$. Thus, the regulated value of $V_{OUT}$ for converter 200 must be related to $V_{IN}$ according to the following equation so that current does not flow from $V_{OUT}$ to $V_{IN}$:

$$V_{OUT} \le \frac{2V_{IN}}{3} \quad (19)$$

Persons skilled in the art further will recognize that the circuitry of the present invention may be implemented using circuit configurations other than those shown and discussed above. For example, a variable resistance may be used in place of current mirror 75/76 in the buck embodiments of FIGS. 7A and 9A. All such modifications are within the scope of the present invention, which is limited only by the claims which follow.

What is claimed is:

1. A method for regulating a voltage at an output node of a boost voltage regulator, the method comprising:

providing a first capacitor;

providing a first switch coupled between the first capacitor and the output node;

providing a second switch coupled to the first capacitor;

controlling the first and second switches to alternately charge the first capacitor from an input voltage and discharge the first capacitor to the output node;

monitoring the voltage at the output node to generate a control signal; and controlling the current flowing through the first capacitor in response to the control signal when the first switch is closed.

2. The method of claim 1 wherein:

monitoring the voltage at the output node to generate the control signal comprises monitoring the voltage at the output node using a resistor divider to generate a voltage feedback signal.

3. The method of claim 2 wherein:

controlling the current flowing through the first capacitor in response to the control signal comprises controlling the current flowing through the first capacitor when the first switch is closed in response to the output signal of an amplifier that compares the voltage feedback signal to a reference signal.

4. The method of claim 1 further comprising:

controlling the current through the first capacitor in response to the control signal when the second switch is closed.

5. The method of claim 1 further comprising:

providing a third switch coupled to the first capacitor, wherein the third switch is closed when the first switch is closed; and providing a fourth switch coupled to the first capacitor, wherein the fourth switch is closed when the second switch is closed, wherein the first switch is switched out of phase with the second switch.

6. The method of claim 1 further comprising a current mirror that conducts current from the input voltage during a blanking interval when the first and the second switches are open.

7. A method for regulating a voltage at an output node of a boost voltage regulator, the method comprising:

providing a first capacitor;

providing a first switch coupled between the first capacitor and the output node;

providing a second switch coupled to the first capacitor;

controlling the first and second switches to alternately charge the first capacitor from an input voltage and discharge the first capacitor to the output node;

monitoring the voltage at the output node to generate a control signal; and controlling the current flowing through the first capacitor in response to the control signal when the first switch is closed, by providing a variable resistance in series between the input voltage and the first capacitor when the first switch is closed, wherein the variable resistance is responsive to the control signal.

8. The method of claim 7 wherein the variable resistance comprises a transistor.

9. A method for regulating a voltage at an output node of a boost voltage regulators the method comprising:

providing a first capacitor;

providing a first switch coupled between the first capacitor and the output node;

providing a second switch coupled to the first capacitor;

controlling the first and second switches to alternately charge the first capacitor from an input voltage and discharge the first capacitor to the output node;

monitoring the voltage at the output node to generate a control signal;

controlling the current flowing through the first capacitor in response to the control signal when the first switch is closed; and controlling the current through the first capacitor in response to the control signal when the second switch is closed, by providing a variable resistance in series between the input voltage and the first capacitor when the second switch is closed.

10. A method for regulating a voltage at an output node of a boost voltage regulator, the method comprising:

providing a first capacitor;

providing a first switch coupled between the first capacitor and the output node;

providing a second switch coupled to the first capacitor;

controlling the first and second switches to alternately charge the first capacitor from an input voltage and discharge the first capacitor to the output node;

monitoring the voltage at the output node to generate a control signal;

controlling the current flowing through the first capacitor in response to the control signal when the first switch is closed, by providing a current mirror, wherein current flows from the input voltage through the current mirror to the first capacitor.

11. The method of claim 10 further comprising:

controlling the current through the first capacitor when the second switch is closed by providing the current mirror which is responsive to the control signal.

12. A method for regulating a voltage at an output node of a boost voltage regulator, the method comprising:

providing a first capacitor;

providing a first switch coupled between the first capacitor and the output node;

providing a second switch coupled to the first capacitor;
controlling the first and second switches to alternately charge the first capacitor from an input voltage and discharge the first capacitor to the output node;
monitoring the voltage at the output node to generate a control signal;
controlling the current flowing through the first capacitor in response to the control signal when the first switch is closed;
controlling the current through the first capacitor in response to the control signal when the second switch is closed by providing a first current mirror that conducts current when the second switch is closed; and
wherein controlling the current flowing through the first capacitor in response to the control signal when the first switch is closed comprises providing a second current mirror that conducts current when the first switch is closed.

13. The method of claim 12 wherein the current conducted by the first and second current mirrors is responsive to the control signal.

14. The method of claim 12 further comprising:
providing a second capacitor coupled to the second switch;
providing a third switch coupled between the second capacitor and the output node that is closed when the first switch is closed; and
providing a fourth switch coupled between the second capacitor and ground that is closed when the second switch is closed,
wherein the first switch is switched out of phase with the second switch.

15. A method for regulating a voltage at an output node of a buck voltage regulator, the method comprising:
providing first and second capacitors;
providing a first switch coupled to the first capacitor and a second switch coupled to the second capacitor;
switching the first switch to charge the first capacitor from an input voltage;
switching the second switch out of phase with the first switch to charge the second capacitor from the input voltage;
monitoring the voltage at the output node to generate a control signal; and
controlling the current flowing through the first capacitor in response to the control signal when the first switch is closed and controlling the current flowing through the second capacitor in response to the control signal when the second switch is closed.

16. The method of claim 15 wherein:
monitoring the voltage at the output node to generate a control signal comprises providing an amplifier that compares a voltage feedback signal to a reference signal.

17. The method of claim 15 further comprising:
providing a third and fourth switches that are each coupled between the first capacitor and the output node; and
providing a fifth switch coupled to the first capacitor.

18. A method for regulating a voltage at an output node of a buck voltage regulator, the method comprising:
providing first and second capacitors;
providing a first switch coupled to the first capacitor and a second switch coupled to the second capacitor;
switching the first switch to charge the first capacitor from an input voltage;
switching the second switch out of phase with the first switch to charge the second capacitor from the input voltage;
monitoring the voltage at the output node to generate a control signal; and
controlling the current flowing through the first capacitor in response to the control signal when the first switch is closed and controlling the current flowing through the second capacitor in response to the control signal when the second switch is closed,
by providing a current mirror.

19. The method of claim 18 wherein:
monitoring the voltage at the output node to generate the control signal comprises providing a transconductance amplifier that controls the current through the current mirror in response to a voltage feedback signal from the output node.

20. A method for regulating a voltage at an output node of a buck voltage regulator, the method comprising:
providing first and second capacitors;
providing a first switch coupled to the first capacitor and a second switch coupled to the second capacitor;
switching the first switch to charge the first capacitor from an input voltage;
switching the second switch out of phase with the first switch to charge the second capacitor from the input voltage;
monitoring the voltage at the output node to generate a control signal;
controlling the current flowing through the first capacitor in response to the control signal when the first switch is closed and controlling the current flowing through the second capacitor in response to the control signal when the second switch is closed;
providing third and fourth switches that are each coupled between the first capacitor and the output node;
providing a fifth switch coupled to the first capacitor;
providing sixth and seventh switches that are each coupled between the second capacitor and the output node; and
providing an eighth switch coupled to the second capacitor.

21. The method of claim 20 further comprising:
providing a third capacitor coupled to the fifth switch;
providing a ninth switch coupled between the third capacitor and the output node;
providing a tenth switch coupled between the third capacitor and ground; and
providing an eleventh switch coupled to the third capacitor.

22. The method of claim 21 further comprising:
providing a fourth capacitor coupled to the eighth switch;
providing a twelfth switch coupled between the fourth capacitor and the output node;
providing a thirteenth switch coupled between the fourth capacitor and ground; and
providing a fourteenth switch coupled to the fourth capacitor.

23. A boost voltage regulator that regulates a voltage at an output node, comprising:
a first capacitor;

a first switch coupled between the first capacitor and the output node;

a second switch coupled to the first capacitor, wherein current alternately flows from an input voltage to the first capacitor and from the first capacitor to the output node;

feedback loop circuitry that monitors the voltage at the output node and generates a control signal; and a transistor that controls the current flowing through the first switch in response to the control signal when the first switch is closed.

24. The regulator of claim 23 wherein:

the feedback loop circuitry comprises a resistor divider that generates a voltage feedback signal and an amplifier that compares the voltage feedback signal with a reference signal.

25. The regulator of claim 23 wherein:

the transistor comprises a variable resistance in series between the input voltage and the first capacitor when the first switch is closed, wherein the variable resistance is responsive to the control signal.

26. The regulator of claim 23 wherein:

the transistor controls the current through the second switch in response to the control signal when the second switch is closed.

27. The regulator of claim 23 further comprising:

a third switch coupled to the first capacitor, wherein the third switch is closed when the first switch is closed; and a fourth switch coupled to the first capacitor, wherein the fourth switch is closed when the second switch is closed, wherein the first switch is switched out of phase with the second switch.

28. The regulator of claim 23 wherein:

the transistor is part of a current mirror that controls the current through the first switch in response to the control signal when the first switch is closed.

29. The regulator of claim 28 wherein the current mirror controls the current through the second switch when it is closed.

30. A boost voltage regulator that regulates a voltage at an output node, comprising:

a first capacitor;

a first switch coupled between the first capacitor and the output node;

a second switch coupled to the first capacitor, wherein current alternately flows from an input voltage to the first capacitor and from the first capacitor to the output node;

feedback loop circuitry that monitors the voltage at the output node and generates a control signal; and a transistor that controls the current flowing through the first switch in response to the control signal when the first switch is closed, wherein the transistor controls the current through the second switch in response to the control signal when the second switch is closed, wherein the transistor comprises a variable resistance coupled in series between the input voltage and the first capacitor when the second switch is closed, and wherein the variable resistance is responsive to the control signal.

31. A boost voltage regulator that regulates a voltage at an output node, comprising:

a first capacitor;

a first switch coupled between the first capacitor and the output node;

a second switch coupled to the first capacitor, wherein current alternately flows from an input voltage to the first capacitor and from the first capacitor to the output node;

feedback loop circuitry that monitors the voltage at the output node and generates a control signal;

a transistor that controls the current flowing through the first switch in response to the control signal when the first switch is closed, wherein the transistor is part of a first current mirror that controls the current through the first switch in response to the control signal when the first switch is closed;

and the regulator further comprises:

a second current mirror that controls the current through the second switch in response to the control signal when the second switch is closed.

32. The regulator of claim 31 wherein the current conducted by the first and second current mirrors is responsive to the control signal.

33. The regulator of claim 32 further comprising:

a second capacitor coupled to the second switch;

a third switch coupled between the second capacitor and the output node that is closed when the first switch is closed; and a fourth switch coupled between the second capacitor and ground that is closed when the second switch is closed, wherein the first switch is switched out of phase with the second switch.

34. The regulator of claim 23 further comprising a current mirror that conducts current in response to the control signal from the input voltage during a blanking interval when the first and the second switches are open.

35. The regulator of claim 23 wherein duty cycle of the first and second switches is proportional to the input-to-output voltage conversion ratio.

36. A buck voltage regulator that regulates a voltage at an output node, comprising:

first and second capacitors;

a first switch coupled to the first capacitor;

a second switch coupled to the second capacitor that is switched out of phase with the first switch, wherein current alternately flows from an input voltage to the first capacitor and from the input voltage to the second capacitor;

feedback loop circuitry that monitors the voltage at the output node to generate a control signal; and a transistor that controls the current through the first switch when it is closed and the current through the second switch when it is closed in response to the control signal.

37. The regulator of claim 36 wherein:

the transistor is part of a current mirror coupled between the input voltage and the first and second switches.

38. The regulator of claim 36 wherein the feedback loop circuitry comprises:

an amplifier that compares a voltage feedback signal from the output node to a reference signal.

39. The regulator of claim 38 wherein the feedback loop circuitry further comprises:

a resistor divider coupled to the output node and the amplifier, the resistor divider generating the voltage feedback signal.

40. The regulator of claim 36 further comprising:

a third and fourth switches that are each coupled between the first capacitor and the output node; and a fifth switch coupled to the first capacitor.

41. The regulator of claim 40 further comprising:

a sixth and seventh switches that are each coupled between the second capacitor and the output node; and an eighth switch coupled to the second capacitor.

42. A buck voltage regulator that regulates a voltage at an output node, comprising:

first and second capacitors;

a first switch coupled to the first capacitor;

a second switch coupled to the second capacitor that is switched out of phase with the first switch, wherein current alternately flows from an input voltage to the first capacitor and from the input voltage to the second capacitor;

feedback loop circuitry that monitors the voltage at the output node to generate a control signal;

a transistor that controls the current through the first switch when it is closed and the current through the second switch when it is closed in response to the control signal, wherein the transistor comprises a variable resistance.

43. A buck voltage regulator that regulates a voltage at an output node, comprising:

first and second capacitors;

a first switch coupled to the first capacitor;

a second switch coupled to the second capacitor that is switched out of phase with the first switch, wherein current alternately flows from an input voltage to the first capacitor and from the input voltage to the second capacitor;

feedback loop circuitry that monitors the voltage at the output node to generate a control signal;

a transistor that controls the current through the first switch when it is closed and the current through the second switch when it is closed in response to the control signal;

third and fourth switches that are each coupled between the first capacitor and the output node;

a fifth switch coupled to the first capacitor;

sixth and seventh switches that are each coupled between the second capacitor and the output node;

an eighth switch coupled to the second capacitor; and a third capacitor coupled to the fifth switch;

a ninth switch coupled between the third capacitor and the output node;

a tenth switch coupled between the third capacitor and ground; and an eleventh switch coupled to the third capacitor.

44. The regulator of claim 43 further comprising:

a fourth capacitor coupled to the eighth switch;

a twelfth switch coupled between the fourth capacitor and the output node;

a thirteenth switch coupled between the fourth capacitor and ground; and a fourteenth switch coupled to the fourth capacitor.

\* \* \* \* \*

UNITED STATES PATENT AND TRADEMARK OFFICE
CERTIFICATE OF CORRECTION

PATENT NO.     : 6,411,531 B1
DATED          : June 25, 2002
INVENTOR(S)    : Nork et al.

It is certified that error appears in the above-identified patent and that said Letters Patent is hereby corrected as shown below:

Title page,
Item [56], OTHER PUBLICATIONS, change "4–26–4–37" to -- 4–26 - 4–37 --.

Column 2,
Line 24, change "SA" to -- 5A --.
Line 29, change "C/DC" to -- DC/DC --.

Column 3,
Line 9, change "converter is" to -- converter 20 is --.
Line 61, change "Oscillator outputs" to -- Oscillator 25 outputs --.

Column 4,
Lines 45-50, delete "The current through a capacitor is determined by the following standard equation:
$$I = C \frac{dV}{dt}".$$

Line 56, change "$(dV_{tx})$" to -- $(dV_{t_x})$ --.

Line 58, change "$(dV_{ty})$" to -- $(dV_{t_y})$ --.

Line 63, change "$dV_{tx} = dV_{tY} = \frac{I_{R38}}{C_8} t_x = \frac{I_{R38}}{C_8} t_Y$"

to -- $dV_{t_x} = dV_{t_Y} = \frac{I_{R38}}{C_8} t_x = \frac{I_{R38}}{C_8} t_Y$ --.

Line 66, change "$t_x$" to -- $t_x$ --.

Column 5,
Line 1, change "$t_y$" to -- $t_Y$ --.

Line 4, change "$t_x = t_y$" to -- $t_x = t_Y$ --.

Line 7, change "$t_x$ and $t_y$" to -- $t_x$ and $t_Y$ --.

UNITED STATES PATENT AND TRADEMARK OFFICE
CERTIFICATE OF CORRECTION

PATENT NO.    : 6,411,531 B1
DATED         : June 25, 2002
INVENTOR(S)   : Nork et al.

It is certified that error appears in the above-identified patent and that said Letters Patent is hereby corrected as shown below:

Column 6,
Line 53, change "n-channel" to -- N-channel --.
Line 54, change "p-channel" to -- P-channel --.

Column 8,
Line 63, change "<" to -- $\leq$ --.
Line 64, change "$(dV_{tx})$" to --$(dV_{t_x})$--.

Line 66, change "$(dV_{ty})$" to --$(dV_{t_Y})$--.

Column 9,
Line 2,   change "$dV_{tx} = dV_{tY} = \frac{N \cdot I_{GM}}{C_8} t_X = \frac{N \cdot I_{GM}}{C_8} t_Y$"
to --$dV_{t_X} = dV_{t_Y} = \frac{N \cdot I_{GM}}{C_8} t_X = \frac{N \cdot I_{GM}}{C_8} t_Y$--.

Line 6, change "$(t_x)$" to --$(t_X)$--.

Line 8, change "$(t_y)$" to --$(t_Y)$--.

Line 10, change "$t_x = t_y$" to --$t_X = t_Y$--.

Line 11, change "$t_x$ and $t_y$" to --$t_X$ and $t_Y$--.

Line 56, change "IN" to --$I_{IN}$--.

Line 67, change "p-channel" to -- P-channel --.

Column 10,
Line 1, change "p-channel" to -- P-channel --.
Line 11, change "p-channel" to -- P-channel --.
Line 33, change "p-channel" to -- P-channel --.

UNITED STATES PATENT AND TRADEMARK OFFICE
CERTIFICATE OF CORRECTION

PATENT NO. : 6,411,531 B1
DATED : June 25, 2002
INVENTOR(S) : Nork et al.

It is certified that error appears in the above-identified patent and that said Letters Patent is hereby corrected as shown below:

Column 12,
Line 16, change "≦" to -- ≤ --.

Column 13,
Line 19, change "≦" to -- ≤ --.

Column 14,
Line 55, change "$I_{IN} = I_{GM} + I_{M28} = I_{GM}(1+N)$" to -- $I_{IN} = I_{GM} + I_{M128} = I_{GM}(1+N)$ --.

Column 15,
Line 19, change "$(dV_{tA})$" to -- $(dV_{t_A})$ --.

Line 21, change "$(dV_{tB})$" to -- $(dV_{t_B})$ --.

Line 32, change "$T_A$ and $T_B$" to -- $t_A$ and $t_B$ --.

Line 35, change "$T_B = 2T_A$" to -- $t_B = 2t_A$ --.

Line 50, change "≦" to -- ≤ --.

Column 16
Line 19, change "pervious" to -- previous --.

Signed and Sealed this

Twenty-fifth Day of February, 2003

JAMES E. ROGAN
*Director of the United States Patent and Trademark Office*